United States Patent [19]
Rogers et al.

[11] Patent Number: 5,888,397
[45] Date of Patent: *Mar. 30, 1999

[54] PROCESS FOR RECOVERING CHAOTROPIC ANIONS FROM AN AQUEOUS SOLUTION ALSO CONTAINING OTHER IONS

[75] Inventors: Robin Rogers, DeKalb; E. Philip Horwitz, Naperville, both of Ill.; Andrew H. Bond, Tallahassee, Fla.

[73] Assignees: ARCH Develop. Corp., Chicago; The Board of Regents for Northern Illinois University, DeKalb, both of Ill.

[ * ] Notice: The term of this patent shall not extend beyond the expiration date of Pat. No. 5,603,834.

[21] Appl. No.: 478,382

[22] Filed: Jun. 7, 1995

[51] Int. Cl.$^6$ .............................. B01D 11/04; B01D 15/08
[52] U.S. Cl. ................... 210/634; 210/198.2; 210/502.1; 210/635; 423/8
[58] Field of Search ..................................... 210/634, 638, 210/639, 656, 198.2, 263, 502.1, 635, 660; 423/7, 8, 11; 422/70

[56] References Cited

U.S. PATENT DOCUMENTS

| | | | |
|---|---|---|---|
| 4,980,065 | 12/1990 | Hsu | 210/634 |
| 5,078,886 | 1/1992 | Hsu | 210/635 |

OTHER PUBLICATIONS

Bayer et al., "Polystyrene–Immobilized PEG Chains", *Poly-(Ethylene Glycol) Chemistry: Biotechnical and Biomedical Applications*; Harris, ed., Plenum Press, New York, Chapter 20:325–345 (1992).
Regen et al., *J. Am. Chem. Soc.*, 101:116 (Jan. 1979).
Yanigida et al., *J. Org. Chem.*, 44:1099 (Mar. 1979).
Fukunishi et al., *J. Org. Chem.*, 46:1218 (Mar. 1981).
Kimura et al., *Synth. Commun.*, 13:443 (Apr. 1983).
Kimura et al., *J. Org. Chem.*, 48:195 (Jan. 1983).
Jones et al., *Anal. Chim. Acta*, 182:61 (Apr. 1986).
Fong et al., *Talanta*, 39:825 (Jul. 1992).
Herren et al., *J. Coll. Interf. Sci.*, 115:46 (Jan. 1987).
Matsumoto et al. *J. Chromatogr.*, 187:351 (Jan. 1980).
Matsumoto et al., *J. Chromatogr.*, 268:375 (Oct. 1983).
Matsumoto et al., *J. Chromatogr.* 285:69 (Feb. 1984).
Rogers et al., *Sep. Sci. Technol.*, 28:1091 (Apr. 1993).
Rogers et al., *Sep. Sci. Technol.*, 28:139–153 (Jan. 1993).
Schwochau, Klaus, *Agnew. Chem. Int. Ed. Engl.*, 33:2258–2267 (Dec. 1994).
Marcus, Yizhak, "Structural aspects of hydration", *Ion Solvation*, John Wiley & Sons Ltd., Department of Inorganic and Analytical Chemistry–The Hebrew University of Jerusalem, Isreal, Chapter 5.4, pp. 113–128 (1985).
Marcus, Yizhak, "Thermodynamics of Solvation of Ions", *J. Chem. Soc. Faraday Trans.*, 87:2995–2999 (Sep. 1991).
Lisic et al., *J. Nuc. Med.*, 32:945 (May 1991), Abstract No. 155.
Schaab et al., *J. Nuc. Med.*, 32:1090 (May 1991), Abstract No. 769.
Ehrhardt et al., *J. Nuc. Med.*, 34:38P (Jun. 1993), Abstract No. 144.
Griffiths et al., *J. Nuc. Med*, 32:1098 (May 1991), Abstract No. 802.
Heffernan et al., *J. Chem. Soc., Perkin Trans. 2*, 514 (Mar. 1981).

*Primary Examiner*—Joseph W. Drodge
*Attorney, Agent, or Firm*—Welsh & Katz, Ltd.

[57] ABSTRACT

A solid/liquid process for the separation and recovery of chaotropic anions from an aqueous solution is disclosed. The solid support comprises separation particles having surface-bonded poly(ethylene glycol) groups, whereas the aqueous solution from which the chaotropic anions are separated contains a poly(ethylene glycol) liquid/liquid biphase-forming amount of a dissolved salt (lyotrope). A solid/liquid phase admixture of separation particles containing bound chaotropic anions in such an aqueous solution is also contemplated, as is a chromatography apparatus containing that solid/liquid phase admixture.

28 Claims, 19 Drawing Sheets

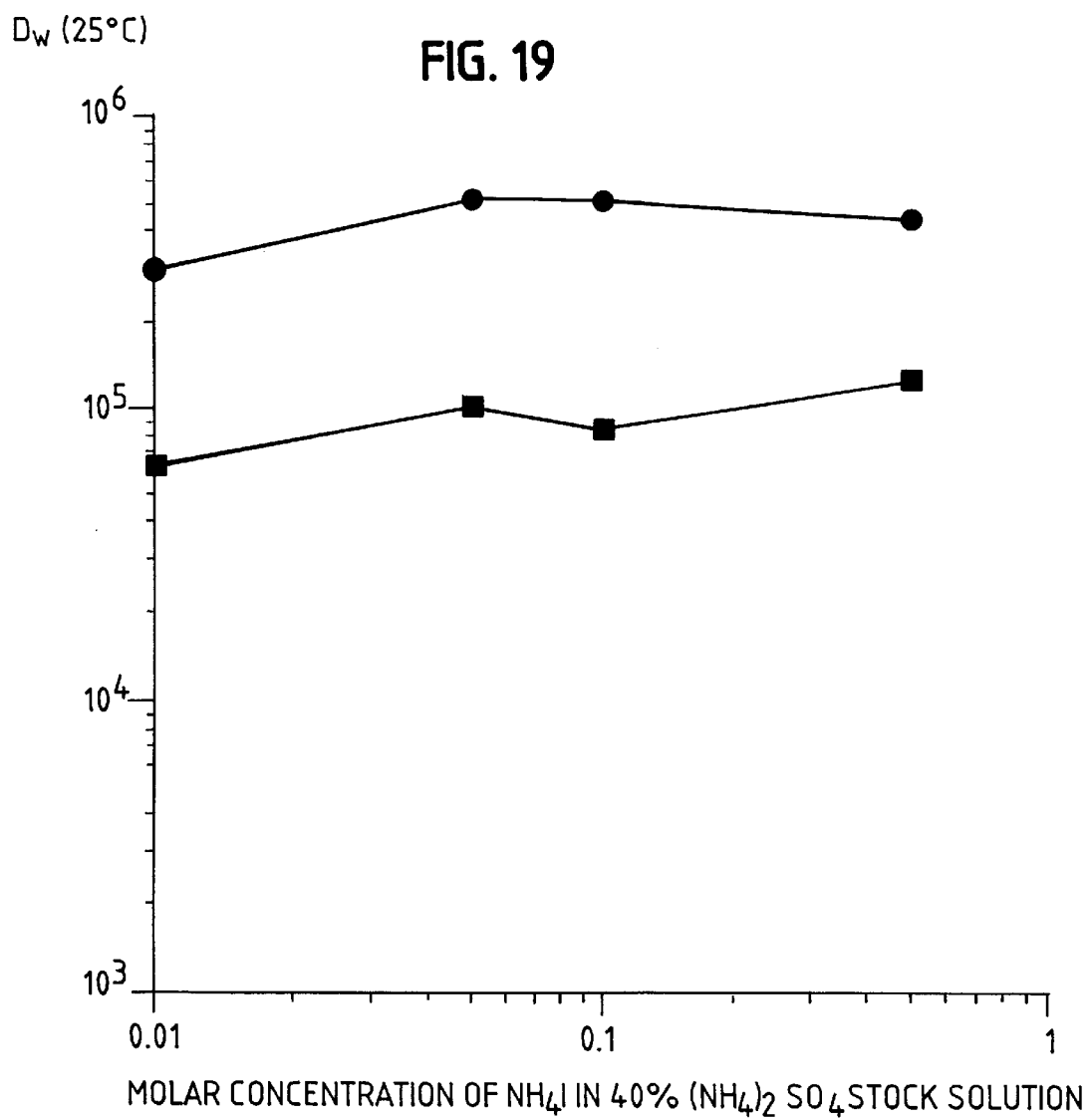

PROCESS FOR RECOVERING CHAOTROPIC ANIONS FROM AN AQUEOUS SOLUTION ALSO CONTAINING OTHER IONS

GOVERNMENTAL SUPPORT AND RIGHTS

This invention was made with government support pursuant to Contract No. W-31-109-ENG-38 between the U.S. Department of Energy and The University of Chicago, contractor for Argonne National Laboratory. The Government has certain rights in this invention.

TECHNICAL FIELD

The present invention relates to the separation and recovery of chaotropic anions from aqueous solutions that also contain lyotropic anions in a solid/liquid separation process such as a chromatographic process, as well as an aqueous admixture that contains chaotropic anion-bound particles and a chromatographic apparatus containing separated, bound chaotropic anions.

BACKGROUND ART

Solid support-based chromatographic methods have been extensively applied in separation science for many years. [Harris, Quantitative Chemical Analysis, 2nd ed., W. H. Freeman and Co., New York (1987); Skoog, Principles of Instrumental Analysis, 3rd ed., Saunders College Publishing, New York (1985); Giddings, Unified Separation Science, John Wiley & Sons, New York, (1991)] Excellent chemical separations can be achieved due to the inherent variables of solid/liquid chromatography [Skoog, Principles of Instrumental Analysis, 3rd, ed., Saunders College Publishing, New York (1985)] that include the ability to vary both the support material and mobile phase. Several advantages over solvent extraction include the immobilization of the extractant and the absence (or decreased need in the case of extraction chromatography) of organic solvent diluents. As for solvent extraction, scale-up of solid support-based chromatographic methods is feasible with the major concern of the pressure drop across a large column balanced by the simplicity of the chromatographic apparatus versus liquid/liquid contactor apparatus.

Due to the rich history of liquid/liquid aqueous biphasic separations for biological separations, [Poly(Ethylene Glycol) Chemistry: Biotechnical and Biomedical Applications; Harris, ed., Plenum Press, New York (1992); Aqueous Two-Phase Systems, Walter and Johansson, eds., in Methods in Enzymology, Academic Press, San Diego, Vol. 228 (1994); Albertsson, Partition of Cell Particles and Macromolecules, 3rd ed., John Wiley & Sons, New York (1986); Partitioning in Aqueous Two-Phase Systems. Theory, Methods, Uses and Applications to Biotechnology, Walter, Brooks and Fisher, eds., Academic Press, Orlando (1991)] work on solid-supported biphasic separations has focused on biological species. No work has been reported in the area of aqueous biphasic partitioning of metal ions using solid support separation particles.

The chelation properties of solid-supported short chain polyethers have been investigated, but the mobile phases were largely aqueous acids and the systems lacked genuine aqueous biphasic behavior. The chelation properties of the high molecular weight poly(ethylene glycols) (PEGs) is generally perceived to be quite low. Consequently, high molecular weight PEG resins have not been investigated for ion separations.

The major variables influencing liquid/liquid aqueous biphasic separations, type and concentration of polymer and salt and polymer molecular weight, are important variables to consider in the design of aqueous biphasic chromatographic materials. The current focus is on chaotropic metal ion separations from solutions of high ionic strength because most metal-containing waste streams have relatively high concentrations of matrix ions.

Two major drawbacks to aqueous biphasic separations operating in the liquid/liquid mode are loss of the phase-forming components, PEG or salt, due to their high solubilities in water and the difficulty in stripping partitioned solutes. Because high concentrations of the phase-forming components are required to sustain a two-phase system, any loss of PEG or salt is of concern. In addition, different concentrations of phase-forming components have been shown to affect metal ion distribution ratios in liquid/liquid systems. [Rogers et al., Solvent Extr. Ion Exch., (in press 1995); Rogers et al., Aqueous Biphasic Separations: Biomolecules to Metal Ions, (in press 1995)]

More importantly, once the solute of interest has been partitioned to the upper PEG-rich phase of an aqueous liquid/liquid biphase, its isolation from this matrix has proven to be difficult. The back extraction conditions vary from chemical destruction of the extractant and partitioned complex to chemical reduction of the partitioned species [pertechnetate reduction by tin(II) chloride]. [Rogers et al., Solvent Extr. Ion Exch., (in press 1995); Rogers et al., Aqueous Biphasic Separations: Biomolecules to Metal Ions, (in press 1995)]

Examination of the salts that induce aqueous liquid/liquid biphase formation of PEG solutions by the present inventors has indicated that those salts are among the materials referred to in the art as lyotropes or lyotropic agents. Such salts tend to structure water, and the structure provided to the water by a lyotropic salt is thought to cause salting out of the PEG phase.

Polyethylene glycols have been bound to a variety of different materials, with the choice of support based primarily on the desired application. Solid-supported short chain PEGs have been grafted to styrene-based resins for use as phase transfer catalysts in organic synthesis, [Regen et al., J. Am. Chem. Soc., 101:116 (1979); Yanagida et al., J. Org. Chem., 44:1099 (1979); Fukunishi et al., J. Org. Chem., 46:1218 (1981); Heffernan et al., J. Chem. Soc., Perkin Trans. 2:514 (1981); Kimura et al., Synth. Commun., 13:443 (1983); Kimura et al., J. Org. Chem., 48:195 (1983)] and to urethane foams to act as potential metal ion chelators. [Jones et al., Anal. Chim. Acta, 182:61 (1986); Fong et al., Talanta, 39:825 (1992)] Polyethers have also been bound to various surfaces to decrease protein adhesion in biomedical applications [Nagaoka et al., Antithrhombogenic Biomedical Material, Toray Industries, Inc. (1983); Toyobo Co., Antithrhombogenic Membranes, Toyobo Co. (1983)] and medium weight PEGs have been fused to silica capillaries for a variety of separations. [Nashabeh et al., J. Chromatogr., 559:367 (1991); Herren et al., J. Coll. Interf. Sci., 115:46 (1987)] High molecular weight PEGs have been bound to silica [Matsumoto et al., J. Chromatoqr., 187:351 (1980)] and Sepharose [Matsumoto et al., J. Chromatogr., 187:351 (1980); Matsumoto et al., J. Chromatoqr., 268:375 (1981); Matsumoto et al., J. Chromatoqr., 285:69 (1984)] primarily for polymer/polymer separations of biomolecules. Two recent reviews of PEG chemistry also point to the utility of solid-supported PEGs for bioanalytical separations. [Poly (Ethylene Glycol) Chemistry: Biotechnical and Biomedical Applications, Harris ed., Plenum Press, New York (1992);

*Aaueous Two-Phase Systems,* Walter et al., eds., in *Methods in Enzymology* Academic Press, San Diego, 228 (1994)] Each of the previously mentioned materials served as chelators or hydrophilic coatings to promote or inhibit different types of adsorption processes.

The importance of $^{99m}$Tc in nuclear medicine and the problems associated with disposal of $^{99}$Tc in nuclear waste require new and better separations technologies for this element. In radiopharmacy, the short-lived $^{99m}$Tc ($t_{1/2}$=6 hours) that decays to $^{99}$Tc ($t_{1/2}$=2.12×10$^5$ years), is used in the vast majority of all medical procedures utilizing radioisotopes. [Boyd, *Radiochim. Acta,* 30:123 (1982); Steigman, *The Chemistry of Technetium in Medicine,* National Academy Press, Washington, D.C. (1992)]

One of the more common ways to access $^{99m}$Tc is by eluting the pertechnetate ion (TcO$_4^{-1}$), a chaotropic anion, from an alumina column containing $^{99}$MoO$_4^{-2}$ ion ($t_{1/2}$=66.7 hours), itself obtained by neutron activation irradiation of $^{98}$Mo or as a $^{235}$U fission product. So-called "instant technetium" involves the solvent extraction of $^{99m}$TcO$_4^{-1}$ from an alkaline solution of Na$_2$$^{99}$MoO$_4$ using methyl ethyl ketone. Both methods suffer disadvantages including the presence of organic impurities and low radiochemical yield. [Boyd, *Radiochim. Acta,* 30:123 (1982); Steigman, *The Chemistry of Technetium in Medicine,* National Academy Press, Washington, D.C. (1992); Lamson et al., *J. Nucl. Med.,* 16:639 (1975); Nair et al., *Radiochim. Acta,* 57:29 (1992)]

Relatively high levels of $^{99}$TcO$_4^{-1}$ are present in the highly alkaline waste storage tanks at Westinghouse Hanford [Fong et al., *Talanta,* 39:825 (1992)] and Savannah River [Walker et al., *Mat. Res. Soc. Syms. Proc.,* 44:805 (1985)], among others. Technetium-99 is a fission product in nuclear fuel burn-up. Its long half life and its environmental mobility (as TcO$_4^{-1}$) present long term storage problems. [Mobius, et al., "Gmelin Handbook of Inorganic Chemistry, Tc, Technetium: Metal Alloys, Compounds, Chemistry in Solution", 8th ed., Supplemental vol. 2, p. 243, Kugler & Kellar, eds., Springer-Verlag, Berlin (1983); Jones, "Comprehensive Coordination Chemistry", Vol. 6, p. 881, Wilkinson et al., eds., Pergamon Press, Oxford (1987)]

Current extraction technologies for Tc run the gamut from solvent extraction to ion exchange in batch and chromatographic separations, and precipitation reactions. [Mobius, et al., "Gmelin Handbook of Inorganic Chemistry, Tc, Technetium: Metal Alloys, Compounds, Chemistry in Solution", 8th ed., Supplemental vol. 2, p. 243, Kugler & Kellar, eds., Springer-Verlag, Berlin (1983)] The synthetic organic reagents or resins used are often subject to radiation damage (in high level nuclear waste applications) and large cations (e.g., UO$_2^{+2}$, Zr$^{+4}$) can be coextracted. [Mobius, et al., "Gmelin Handbook of Inorganic Chemistry, Tc, Technetium: Metal Alloys, Compounds, Chemistry in Solution", 8th ed., Supplemental vol. 2, p. 243, Kugler & Kellar, eds., Springer-Verlag, Berlin (1983); Jassim et al., *Solvent Extr. Ion Exch.,* 2:405 (1984); Kolarik et al., *Solvent Extr. Ion Exch.,* 7:625 (1989)] New separations techniques and tailored waste forms are needed for selective removal and immobilization of $^{99}$Tc.

The pertechnetate ion partitions to the polymer-rich phase in liquid/liquid PEG-based aqueous biphasic systems from a variety of salt solutions including OH$^{-1}$, CO$_3^{-2}$, SO$_4^{-2}$ and PO$_4^{-3}$. Increasing the incompatibility between the two phases forces more of the TcO$_4^{-1}$ into the PEG-rich phase. This can be accomplished either by increasing the salt concentration or increasing the PEG-2000 concentration from about 20 weight percent to about 70 weight percent of the aqueous solution.

Tungsten (W) and rhenium (Re) are in the same groups in the periodic Table as are molybdenum and technetium, respectively, and share many chemical reactivities with their fellow group members. The perrhenate anion (ReO$_4^{-1}$), particularly as $^{188}$ReO$_4^{-1}$ ($t_{1/2}$=16.9 hours) and $^{186}$ReO$_4^{-1}$ ($t_{1/2}$=90 hrs) are finding increasing use of therapeutic radiopharmaceuticals as a bone cancer pain palliative and when linked to monoclonal antibodies. As $^{99}$TcO$_4^{-1}$ is formed from $^{99}$MoO$_4^{-2}$, $^{188}$ReO$_4^{-1}$ is formed from $^{188}$WO$_4^{-2}$. Several systems for separating $^{188}$ReO$_4^{-1}$ anions from solutions containing $^{188}$Wo$_4^{-1}$ anions similar to those used for separating $^{99}$TcO$_4^{-1}$ anions from $^{99}$MoO$_4^{-2}$ anions have been reported. [Lisie et al., *J. Nuc. Med.,* 32:945(1991); Schaad et al., *J. Nuc. Med.,* 32:1090(1991); Ehrhardt et al., *J. Nuc. Med.,* 34:38P (1993)]

In addition to technetium and rhenium, several other chaotropic metal anions are of particular interest for separation and recovery. For example, effluents containing silver, cadmium, mercury, arsenic, selenium, chromium, lead and barium are regulated. The Y-12 site at Oak Ridge is reported to have mercury contamination problems. In addition, Hg-197 as $^{197}$HgCl$_2$ is used in kidney scans. [Choppin et al., *Radiochemistry and Nuclear Chemistry,* 2nd ed., Chapter 9, Butterworth-Heinemann Ltd., Oxford (1995) pages 266–276] Precious metals such as gold and silver present in mine tailings also require enhanced recovery processes. Elimination of metal ions from waste streams via complexation of silver, gold, cadmium, mercury and lead with halide or pseudohalide anions is desirous.

Radioactive iodide anion, particularly as I-123, I-125 and I-131, are widely used in radiopharmacy. These anions are mostly used for thyroid studies, but are also useful for kidney studies. [Ehmann and Vance, *Radiochemistry and Nuclear Methods of Analysis,* Chapter 10, Wiley, New York (1981) pages 331–342; Friedlander et al., *Nuclear and Radiochemistry,* Chapter 11, Wiley, New York (1981) pages 442–448]

In addition, I-129 is a fission product that is present in the waste tanks of the Westinghouse Hanford facility. Because of its long half-life (about 1.7×10$^7$ years) and environmental mobilit, this nuclide needs to be removed from wastes. [*Chemical Pretreatment of Nuclear Waste for Disposal,* Swanson et al. eds., Plenum, New York 1994) pages 155–209]

It would therefore be beneficial if the selective binding of chaotropic anions to PEG resins found in aqueous biphasic separations could be adapted to a solid support-based separation and recovery process, while at the same time, overcoming the problems inherent in recovering the chaotropes from an aqueous biphasic separation system using a solid phase that is not adversely affected by radiation present. The discussion that follows provides one solution to the chaotrope recovery problem for many of the above-named elements, as well as others.

BRIEF SUMMARY OF THE INVENTION

The present invention relates to a separation and recovery process that effectively separates and recovers chaotropic anions from an aqueous solution containing other ions, as well as an aqueous admixture containing chaotropic anion-bound particles and a chromatography apparatus containing separated, bound chaotropic anions.

In one embodiment, a process for recovering chaotropic anions from an aqueous solution is contemplated. That process comprises the steps of:

(a) contacting separation particles with an aqueous solution containing (i) chaotropic anions and (ii) a poly(ethylene glycol) liquid/liquid biphase-forming amount of a dissolved salt (lyotrope) to form a solid/liquid phase admixture. The separation particles comprise particles having a plurality of covalently bonded —X—(CH$_2$CH$_2$O)$_n$—CH$_2$CH$_2$R groups wherein X is O, S, NH or N—(CH$_2$CH$_2$O)$_m$—R$^3$ where m is a number having an average value of zero to about 225, n is a number having an average value of about 15 to about 225, R$^3$ is hydrogen, C$_1$–C$_2$ alkyl, 2-hydroxyethyl or CH$_2$CH$_2$R, and R is selected from the group consisting of —OH, C$_1$–C$_{10}$ hydrocarbyl ether having a molecular weight up to about one-tenth that of the —(CH$_2$CH$_2$O)$_n$— portion, carboxylate, sulfonate, phosphonate and —NR$^1$R$^2$ groups where each of R$^1$ and R$^2$ is independently hydrogen, C$_2$–C$_3$ hydroxyalkyl or C$_1$–C$_6$ alkyl, or —NR$^1$R$^2$ together form a 5- or 6-membered cyclic amine having zero or one oxygen atom or zero or one additional nitrogen atom in the ring. The separation particles having a percent CH$_2$O/mm$^2$ of particle surface area of greater than about 8000 and less than about 1,000,000.

(b) That contact is maintained for a time period sufficient to form chaotropic anion-bound separation particles and an aqueous solution having a reduced concentration of chaotropic anion.

(c) The chaotropic anion-bound separation particles are contacted with a second aqueous solution that does not contain a poly(ethylene glycol) liquid/liquid biphase-forming amount of dissolved salt to free the chaotropic anions from the separation particles and form an aqueous solution containing free chaotropic anions.

(d) The free chaotropic anion-containing aqueous solution is then recovered.

In preferred practice, the chaotropic anion-bound separation particles (solid phase) are separated from the aqueous solution (liquid phase) of step (b) in the presence of an aqueous solution of a poly(ethylene glycol) liquid/liquid biphase-forming amount of a salt (lyotrope) to form a second solid/liquid phase admixture containing chaotropic-bound separation particles.

In one embodiment, the chaotropic anion is a simple anion such as Br$^{-1}$ and I$^{-1}$ or a radical such as TcO$_4^{-1}$, ReO$_4^{-1}$ or IO$_3^{-1}$. In another embodiment, the chaotropic anion is a complex of a metal cation and halide or pseudohalide anions. Where the chaotrope is such a complex, each of the aqueous solutions of steps (a) and (b), and also the aqueous solution of the preferred step after step (b) in which a second solid/liquid phase admixture is formed also contains an amount of halide or pseudohalide anions that is sufficient to form the complex.

Another embodiment of the invention contemplates a solid/liquid phase admixture that comprises chaotrope-bound separation particles as the solid phase in an aqueous solution of a poly(ethylene glycol) liquid/liquid biphase-forming amount of a dissolved salt. The separation particles are as discussed before. A contemplated solid/liquid phase admixture is particularly useful within a chromatography column as part of a chromatography apparatus.

The above-mentioned preferences noted for the process apply also to the solid/liquid phase admixture and chromatography apparatus. Similarly, where the chaotrope is a complex of a metal cation and halide or pseudohalide anions, the above aqueous solution also contains a complex forming amount of halide or pseudohalide anions.

BRIEF DESCRIPTION OF THE DRAWINGS

In the drawings forming a portion of this disclosure,

FIG. 19 is a graph showing $D_w$ values for metal cation complexes of $Hg^{+2}$ or $Cd^{+2}$ and iodide anions separated and recovered from separate solutions of $Hg^{+2}$ and $Cd^{+2}$ cations in 40 percent (w/w) $(NH_4)_2SO_4$ solution at various concentrations of $NH_4I$. Values for $Cd^{+2}$ are shown as darkened circles, whereas values for $Hg^{+2}$ are shown as darkened squares.

DETAILED DESCRIPTION OF THE INVENTION

Figure 1:
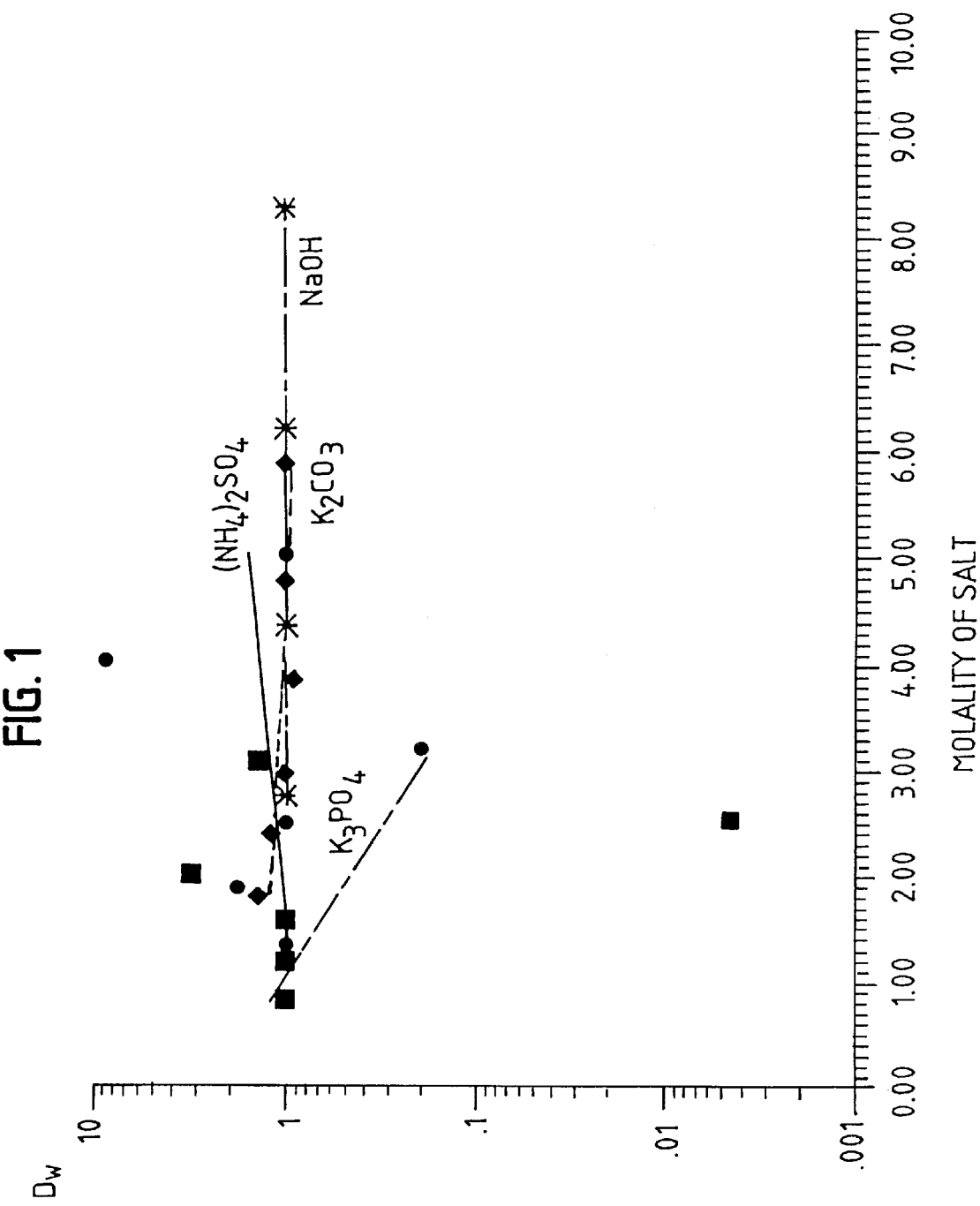
FIG. 1 is a graph of D$_w$ values for TcO$_4^{-1}$ ions versus the molality of several salts using 107–350 particles at 25° C. Here, data obtained using (NH$_4$)$_2$SO$_4$ as the liquid/liquid biphase-forming salt are shown as darkened squares, those obtained using NaOH as the biphase former are shown as stars, those obtained using K$_2$CO$_3$ as the biphase former are shown using darkened diamonds, and those obtained using K$_3$PO$_4$ as the biphase former are shown using darkened circles.

It has now been found that the benefits of PEG-induced chaotrope separations observed in liquid/liquid separations can be had in a solid support-based solid/liquid phase separation process in which particular PEGs are bonded to solid particles. It has also surprisingly been found that the separated chaotropic anions can be readily recovered from the solid-supported PEG resin, thereby overcoming the major drawback of the liquid/liquid separation process. Still more surprising is the fact that the distribution factor for a separated chaotrope, $D_w$, can be about an order of magnitude or more greater in the solid/liquid phase process than in the liquid/liquid process. In addition, radiation damage to the solid support after several separation and recovery procedures is minimal to being undetectable.

The Process

In accordance with a process aspect of this invention, recovery of chaotropic anions from an aqueous solution containing a chaotrope and other anions is contemplated. Before discussing a contemplated process, a definition of chaotropic anions or chaotropes is in order.

A chaotropic anion destructures or breaks-up the structure of liquid water. The effects of chaotropes were noted by Hofmeister in 1888 as a function of protein solubility and a "series" of anions was developed based on protein solubilities in solutions containing those anions. See, Collins et al., Quart. Rev. Biophysics, 18(4):323–422 (1985). As noted by Collins et al., several physical measurements such as heats of hydration and entropy changes on hydration of ions have been used to characterize water structure-making and water structure-breaking characteristics of ions.

More particular entropy changes on the structure of water ($\Delta S_{istr}$) are provided in Table 5.13 in Y. Marcus, Ion Solvation, John Wiley & Sons, Ltd., New York (1985) 124–127. Ions that exhibit negative $\Delta S_{istr}$ values generally enhance the structure of water and are lyotropes, whereas those with positive values generally destructure water and are chaotropes. The iodate anion, $IO_3^{-1}$ is an exception to this generality.

Another useful numerical definition for a chaotropic anion is provided by the $B_i$ value of Gurney, Ionic Processes in Solution, McGraw-Hill, New York (1953) that are also noted in Table 5.13 of the Marcus text. This value is a function of viscosity, with those ions that enhance viscosity being water structure makers and those that lower viscosity being water structure breakers. Here, values of $B_i$ that are negative denote chaotropic ions, whereas those ions having positive values are lyotropic water structure makers.

Exemplary chaotropic anions include the $TcO_4^{-1}$, $ReO_4^{-1}$, $Br^{-1}$, $I^{-1}$ and $IO_3^{-1}$ radicals or moieties.

Chaotropic anions that are a complex of a metal cation and a halide or pseudohalide are also contemplated. The halides contemplated here exclude fluoride, and include chloride ($Cl^{-1}$), bromide ($Br^{-1}$) and iodide ($I^{-1}$). Pseudohalides have properties similar to those of halides [Schriver et al., Inorganic Chemistry, W. H. Freeman & Co., New York (1990) 406–407], and include the cyanide ($CN^{-1}$), thiocyanate ($SCN^{-1}$), cyanate ($OCN^{-1}$), fulminate ($CNO^{-1}$) and azide ($N_3^{-1}$) anions.

The metal cation of a contemplated chaotropic complex is typically a "soft" metal cation as noted in Table 1 in Pearson, Science, 151:172–177 (1966), as well as the "borderline" metal cations of that table; i.e., lead(II), tin(II), bismuth(III) and antimony(III). A contemplated metal cation of a contemplated complex is selected from the group consisting of $Ag^{+1}$, $Tl^{+1}$, $Cs^{+1}$, $Cu^{+2}$, $Co^{+2}$, $Zn^{+2}$, $Pd^{+2}$, $Cd^{+2}$, $Pt^{+2}$, $Hg^{+2}$, $Pb^{+2}$, $Sn^{+2}$, $CH_3Hg^+$, $Tl^{+3}$, $In^{+3}$, $Au^{+3}$, $Bi^{+3}$, $Sb^{+3}$, $Te^{+4}$, and $Pt^{+4}$.

A contemplated metal cation complex of a halide or pseudohalide anion has a formation constant whose log value is about 1.5 to about 30. Exemplary log K values for such constants can be found in Smith and Martell, Critical Stability Constants, Volume 4: Inorganic Complexes, Plenum Press, New York (1970) 104–124; as well as in Volume 5, pages 418–423; and Volume 6, pages 455–461.

Use of complex formation provides soluble species where usual compounds are insoluble. For example, silver, lead and mercury form insoluble halides with chloride, bromide and iodide ions, but form soluble complexes with those same ions such as $AgCl_3^{-1}$, whose log K value at 25° C. is over 8. Similarly, mercury(II) forms an insoluble compound, $HgCl_2$, that can be solubilized as a $HgCl_4^{-2}$ anion, whose log K of formation at 25° C. is about 15. Use of a process contemplated here can separate and recover a before-enumerated metal cation as a complex.

A contemplated process comprises the steps of:

(a) contacting separation particles with an aqueous solution containing (i) chaotropic anions, and (ii) poly(ethylene glycol) liquid/liquid biphase-forming amount of a dissolved salt to form a solid/liquid phase admixture. The separation particles comprise particles having a plurality of covalently bonded surface —X—(CH$_2$CH$_2$O)$_n$—CH$_2$CH$_2$R groups wherein X is O, S, NH or N—(CH$_2$CH$_2$O)$_m$—R$_3$, wherein m is a number having an average value of zero to about 225, n is a number having an average value of about 15 to about 225, R$^3$ is hydrogen, C$_1$–C$_2$ alkyl, 2-hydroxyethyl or CH$_2$CH$_2$R, and R is selected from the group consisting of —OH, C$_1$–C$_{10}$ hydrocarbyl ether having a molecular weight up to about one-third that of the —(CH$_2$CH$_2$O)$_n$— portion, carboxylate, sulfonate, phosphonate and —NR$^1$R$^2$ groups where each of R$^1$ and R$^2$ is independently hydrogen, C$_1$–C$_6$ alkyl or C$_2$–C$_3$ hydroxyalkyl, or —NR$^1$R$^2$ together form a 5- or 6-membered cyclic amine having zero or one oxygen atom or zero or one additional nitrogen atom in the ring. The separation particles have a percent CH$_2$O/mm$^2$ of particle surface area of greater than about 8000 and less than about 1,000,000.

(b) That contact is maintained for a time period sufficient to form chaotropic anion-bound separation particles and an aqueous solution containing a reduced concentration of chaotropic anions, thereby separating the chaotrope from other ions. The reduction in chaotrope concentration is preferably to zero. Some chaotropes such as the TcO$_4^{-1}$ anion and ReO$_4^{-1}$ anion are generated from another ion present in solution such as the MoO$_4^{-2}$ anion or the WO$_4^{-1}$ anion, so some TcO$_4^{-1}$ or ReO$_4^{-1}$ anions can form from MoO$_4^{-2}$ or WO$_4^{-2}$ anions by radioactive decay, making the chaotrope concentration greater than zero.

(c) The chaotropic anion-bound separation particles are then preferably separated from the aqueous solution of step (b) in the presence of an aqueous solution of a poly(ethylene glycol) liquid/liquid biphase-forming amount of a salt to form a second solid/liquid phase admixture containing chaotropic anion-bound separation particles.

(d) The chaotropic anion-bound separation particles of step (b) or (c) are contacted with a second aqueous solution that does not contain a poly(ethylene glycol) liquid/liquid biphase-forming amount of salt to free the chaotropic anions from the separation particles and form an aqueous solution containing free chaotropic anions.

(e) The free chaotropic anion-containing aqueous solution is then recovered.

Turning more specifically to the process and its constituent materials and manipulations, one notes that separation particles are utilized. These separation particles are particles that are hydrophilic and include poly(ethylene glycol) groups of a particular length and therefore molecular weight as is discussed hereinafter.

The particles can be quite varied in make-up, and are inert to (do not noticeably react with) and insoluble in the separation/recovery aqueous salt biphase-forming environment that can be very acidic or basic. Exemplary preferred particles are the particularly preferred reacted cross-linked poly(styrene-vinyl benzyl halide) resins often called Merrifield's peptide resin or chloromethylated divinylbenzene cross-linked polystyrene, as well as glass or silica gel. (silica-based) materials, cross-linked poly(ethylene glycol)-containing urethane or urea resins, cross-linked dextran- and agarose-based materials, and also various cross-linked acrylate esters.

It is noted that the separation particles can contain some reactive functionality such as benzyl halide groups that can react in the aqueous biphase-forming environment. However, any such reaction is minimal and does not alter the properties of the separation particles. Such separation particles are then deemed to be "inert" to their environment for the purpose of a separation and recovery as described herein.

As noted before, the cross-linked, styrene-based Merrifield's peptide resins are particularly preferred. These materials are available from a number of commercial sources such as Sigma Chemical Co., St. Louis, Mo. in several sizes and having differing amounts of cross-linking and differing amounts of replaceable chloride ion. The preparation of exemplary resins is also detailed hereinafter. Preferred commercially available materials are 200–400 mesh particles that contain about 0.4–0.9 meq chlorine/gram or about 0.9–1.5 meq chlorine/gram at one percent cross-linking and a material containing about 1 meq chlorine/gram at two percent cross-linking.

Merrifield's peptide resin particles are readily transformed into separation particles by reaction in a solvent inert to the reaction conditions with an alkali metal salt of a desired long chain PEG compound, followed by rinsing to remove any unreacted materials and the alkali metal halide reaction product. The PEG-containing separation particles are therefore referred to as "reacted".

A Merrifield's peptide resin can also first be reacted with a shorter PEG compound such as tetraethylene glycol followed by reaction with ethylene oxide to extend the chains. One such synthetic process is described in Bayer et al., *Poly(Ethylene Glycol) Chemistry: Biotechnical and Biomedical Applications,* Harris ed., Plenum Press, New York (1992) p. 325. A similar reaction can be carried out using an alkanol amine such as mono- or diethanolamine followed by a chain lengthening reaction with ethylene oxide. An aminomethyl Merrifield's peptide resin (Sigma) can similarly be reacted with ethylene oxide to form desired, amine-containing separation particles. Similar reactions using sodium sulfide and then ethylene oxide or 2-mercaptoethanol and then ethylene oxide can be used to form sulfur-containing separation particles.

Another group of solid support particles are cross-linked acrylic esters, particularly those having about 60 to about 98 weight percent glycidyl methacrylate with the remaining amount of monomer being cross-linking agent, and methyl methacrylate. Methyl methacrylate at about 68 to about 48 weight percent, a cross-linker and about 30 to about 50 weight percent of a PEG–750 to –5000 methacrylate ester whose PEG portion has a formula —O—(CH$_2$CH$_2$O)$_n$—CH$_2$CH$_2$R as is discussed hereinafter can also be copolymerized.

Exemplary cross-linking agents for acrylate-based particles include trimethylolpropane trimethacrylate [2-ethyl-2 (2-hydroxymethyl)-1,3-propanediol trimethacrylate], pentaerythritol triacrylate and the like as are well known. A cross-linking agent is typically used at about 1 to about 5 weight percent and more preferably at about 2 to about 4 weight percent of the monomer mixture.

Support particles containing polymerized glycidyl methacrylate repeating units are post-reacted with an appropriate PEG compound to open the epoxy ring to form an ester-linked hydroxy-ether separation particle. Support particles containing PEG ester groups are simply copolymerized with the other ingredients.

Glass-(silica-)based separation particles are also useful herein. These materials typically contain an amine group that is reacted with ethylene oxide or with an epichlorohydrin/PEG compound reaction product to form the desired separation particles.

For example, four aminopropyl controlled pore glass products having different pore sizes are available from Sigma Chemical Co., St. Louis, Mo. These materials are said to have 150–250 μmoles at 200–400 mesh down to 40–100 μmoles at 80–120 mesh of primary amine per gram of material, with lessened activity/gram being present with increasing average pore size from 75 Å to 700 Å.

A preferred silica gel solid matrix can be prepared from the aminopropyl silica gel available from Sigma Chemical Co. that has about 1–2 mmoles of primary amine per gram of material. This material thus has about 5- to 10-times the loading capacity of the controlled pore glass product. This material has a size of about 200–425 mesh and an average pore size of about 150 Å.

Silica gel HPLC supports are also available from Sigma Chemical Co. having average pore diameters of about 60–80 Å and surface areas of about 420 to about 500 mm$^2$/g. These particles are available in average particle diameters of about 5, 10, 30 and 60 microns. These silica-based particles can be converted into separation particles as discussed below.

Silica-based solid supports such as those discussed above are prepared from a suitable silica support such as silica gel or controlled pore glass by the reaction of an organosilicon compound with the support to covalently link an aminoalkylene group to the silica. These reactions are well known in the art. Amino-functional silanes having two or three $C_1$–$C_3$ alkoxy groups are particularly preferred organosilicon compounds for use in such linking reactions. Silanes having a mercapto functional group and those having an acetoxy group convertible to a hydroxyl group by aminolysis after covalent linking to the silicon-based matrix are also available and can be used.

Preferred amino-functional silanes are ω-amino-$C_2$–$C_6$-alkylenetri-$C_1$–$C_3$-alkoxy silanes. Exemplary compounds include 4-aminobutyltriethoxysilane and 3-aminopropyltrimethoxysilane. Other exemplary organosilanes from which a silica-based support particle can be prepared include N-(2-aminoethyl)-3-aminopropylmethyldimethoxysilane, (aminoethyl-aminomethyl)phenethyltrimethoxysilane and N-(6-aminohexyl)aminopropyltrimethoxysilane. These materials are available from Hüls America, Inc., Piscataway, N.J., and their syntheses and use are discussed in *Silicon Compounds: Register and Review*, 5th ed., Anderson et al., eds., Hüls America, Inc., Piscataway, N.J. (1991) and in the citations therein.

A glycidylsilane such as 3-glycidoxypropyl-trimethoxysilane, (3-glycidoxypropyl)diethoxysilane or the like can also be reacted with a silica-based solid support followed by reaction with a desired PEG compound such as PEG-2000 methyl ether to form desired separation particles. Hydroxyl- and mercapto-functional alkoxysilanes such as bis(2-hydroxyethyl)-3-amino-propyltriethoxysilane and 3-mercaptopropylmethyl-dimethoxysilane can also be reacted with a silica-based solid support followed by chain extension with ethylene oxide to provide useful separation particles.

Cross-linked dextran- and agarose-based particles are well known in the separation arts and are commercially available from Sigma Chemical Co. under trademarks Sephadex, Sephacryl, Sepharose and PDX.

Each of the above materials is based upon polymerized glucose molecules that can be polyethoxylated with ethylene oxide to provide desired separation particles. Alternatively, a desired PEG compound can be first reacted with epichlorohydrin and the reaction product reacted with the glucose-based particles to form desired separation particles. In addition, cyanogen bromide activation can be used to add preformed PEG compounds such as the before-discussed PEG methyl ethers. See, for example Mathis et al., *J. Chromatogr.*, 538; 456–461 (1991) and the citations therein.

Polyurethane/urea chemistry can also be utilized to prepare a desired separation particle. Here, a long chain PEG such as PEG-2000 or PEG-5000 is reacted with a di-isocyanate alone, or admixed with a polyamine or polyol to form a prepolymer. Exemplary di-isocyanates, polyamines and polyols include methylenebis(4-phenylisocyanate), toluene di-isocyanate, diethylenetriamine, triethylenetetramine, triethanolamine, N,N,N'-tri(hydroxyethyl)ethylene-diamine, N,N,N',N'-tetra(hydroxyethyl)ethylenediamine, and the like. That prepolymer is then reacted with $C_2$–$C_6$ aliphatic diols or diamines to form polyurethanes and polyurea-urethanes, respectively. Exemplary diols and diamines include ethylene glycol and ethylene diamine, 1,4-butanediol and 1,4-butanediamine, as well as 1,6-hexanediol and 1,6-hexanediamine. A $C_1$–$C_{10}$ hydrocarbyl PEG 750–5000 ether as discussed herein can also be added at this stage as an end capping reagent as is well known. Exemplary materials are discussed in Fong et al., *Talanta*, 39:825(1992) and Jones et al., *Anal. Chim. Acta.*, 182:61(1986).

A PEG compound, as is defined above by the formula X—$(CH_2CH_2O)_n$—$CH_2CH_2R$ and discussed in detail hereinafter, is present on the surface of the separation particles either intrinsically as a result of the copolymerization process that formed the particle or extrinsically from a grafting reaction carried out after the particle is formed. Although not wishing to be bound by theory, the data in hand tend to indicate that although the various solid support particles have pores, the separations contemplated here appear to operate from the outside surfaces of the particles and away from the pores. As a consequence, particles having smaller particle diameters, e.g. 200–400 mesh (75–38 microns) and smaller (5–10 microns), are favored over particles having larger diameters, e.g. 80–120 mesh (180–115 micron), because of the greater surface area per gram provided by the smaller particles. In addition, porous materials having smaller pore sizes are preferred.

The PEG compound present on the separation particles can itself be quite varied in composition, but contains at least one poly(oxyethylene) chain [(—$CH_2CH_2O$—)$_n$] having an average molecular weight of about 700 to about 10,000, with a molecular weight of about 2,000 to about 5,000 being more preferred. More specifically, the PEG compound group of the separation particle corresponds to the formula —X—$(CH_2CH_2O)_n$—$CH_2CH_2R$ where X, n and R are defined and discussed hereinbelow.

In the above formula, n is a number having an average value of about 15 to about 225, and more preferably about 40 to about 130. It is well known that the higher molecular weight PEG compounds are usually mixtures rather than pure compounds having a single molecular weight. As a result, n, the number of ethyleneoxy repeating units, is a number that is an average number.

The terminal R group is selected from the group consisting of —OH, $C_1$–$C_{10}$ hydrocarbyl ether having a molecular weight of up to about one-tenth of the —$(CH_2CH_2O)_n$— portion, carboxylate, sulfonate, phosphonate and —NR$^1$R$^2$ groups, where each of R$^1$ and R$^2$ is independently hydrogen, C$_1$–C$_6$ alkyl or C$_2$–C$_3$ hydroxyalkyl or —NR$^1$R$^2$ together form a 5- or 6-membered cyclic amine having zero or one oxygen atom or zero or one additional nitrogen atom in the ring.

Exemplary C$_1$–C$_{10}$ hydrocarbyl ether groups are well known and include alkyl, alkenyl, alkynyl and aromatic ethers. Illustrative C$_1$–C$_{10}$ ethers thus include methyl, which is most preferred, ethyl, isopropyl, n-butyl, cyclopentyl, octyl, decyl, 2-cyclohexenyl, 3-propenyl, phenyl, 1-naphthyl, 2-naphthyl, benzyl, phenethyl and the like ethers. These ether groups can also be named methoxy, ethoxy, isopropoxy, n-butoxy, cyclopentyloxy, octyloxy, decyloxy, 2-cyclohexenyloxy, 3-propenyloxy, phenoxy, 1-naphthoxy, 2-naphthoxy, enzyloxy and phenethyloxy. A C$_1$–C$_6$ hydrocarbyl group is a particularly preferred R group.

The molecular weight of a C$_1$–C$_{10}$ hydrocarbyl ether can be up to about one-tenth of the weight of the —(CH$_2$CH$_2$O)$_n$— portion of the PEG group. Thus, where n is 20, the —(CH$_2$CH$_2$O)$_n$— portion has a molecular weight of 880 (20×44) so that the molecular weight of R can be up to about 90, or about the weight of a phenoxy group. It is more preferred that the molecular weight of the C$_1$–C$_{10}$ hydrocarbyl group be about 0.2 to about 2 percent of the molecular weight of the —(CH$_2$CH$_2$O)$_n$— portion.

The R$^1$ and R$^2$ portion of an —NR$^1$R$^2$ R group can individually and independently be hydrogen, C$_1$–C$_6$ alkyl or C$_2$–C$_3$ hydroxyalkyl so that R can be a primary amine (—NH$_2$), a secondary amine (—NHR$^1$ or —NHR$^2$) or a tertiary amine. The non-hydrogen R$^1$ and R$^2$ groups that are C$_1$–C$_6$ alkyl are as discussed before, e.g. methyl, ethyl, iso-propyl, sec-butyl, cyclopentyl and hexyl, whereas a C$_2$–C$_3$ hydroxyalkyl group is a 2-hydroxyethyl, 2-hydroxypropyl or 3-hydroxypropyl group.

The nitrogen atom and the R$^1$ and R$^2$ portions of an —NR$^1$R$^2$ group can, together with the depicted nitrogen atom, form a cyclic amine group whose ring contains 5- or 6-members. That 5- or 6-membered ring amine group can contain only carbon atoms in addition to the depicted nitrogen, carbons plus one oxygen or carbons plus one nitrogen atom in addition to that depicted in —NR$^1$R$^2$. Exemplary cyclic amine groups include piperidinyl, pyrrolidinyl, imidazolyl, piperazinyl and morpholinyl groups.

In the above formula, X can be O, S, NH or N—(CH$_2$CH$_2$O)$_m$—R$^3$. Use of an X group that is O, S or NH should be straightforward for the worker of ordinary skill. X is most preferably O, so that the separation particles most preferably have a plurality of covalently bonded surface —O —(CH$_2$CH$_2$O)$_n$—CH$_2$CH$_2$R groups.

Where X is N—(CH$_2$CH$_2$O)$_m$—R$^3$, two PEG groups can be present that are the same or different. Thus, the —(CH$_2$CH$_2$O)$_n$—CH$_2$CH$_2$R portion of the —X— (CH$_2$CH$_2$O)$_n$—CH$_2$CH$_2$R group is always present, and as such, a PEG compound containing about 15 to about 225 —(CH$_2$CH$_2$O)— repeating groups is always linked to the surface of a separation particle. Where X is N—(CH$_2$CH$_2$O)$_m$—R$^3$, m is zero and R$^3$ is hydrogen, X reduces to —NH. However, m can also be about 15 to about 225, and more preferably about 40 to about 130, as can n, as R$^3$ can be CH$_2$CH$_2$R so that the nitrogen atom of an N—(CH$_2$CH$_2$O)$_m$—R$^3$ group can be substituted by two identical PEG groups.

Where R is —OH, that terminal hydroxyl can be the result of the use of poly(ethylene glycol) itself or of an ethoxylation reaction with ethylene oxide. A C$_1$–C$_{10}$ hydrocarbyl ether R group can be preformed as where a PEG-methyl ether is used as is exemplified herein, or that ether group can be formed by an end-capping reaction of particles having a hydroxyl R group with a strong non-nucleophilic base such as sodium hydride and a hydrocarbyl compound having a suitable leaving group such as a halide (e.g. chloro or bromo) or a sulfate ester such as a trifate, mesylate or tosylate group.

Similar end-capping reactions can also be used to add the carboxylate, sulfonate, phosphonate and —NR$^1$R$^2$ R groups. Exemplary compounds useful here include 2-chloroacetic acid, 4-(2-chloroethyl)piperidine and 1-(2-chloroethyl) pyrrolidine. N-(2-chloroethyl)succinimide or phthalimide can be similarly added to a terminal R hydroxy group followed by reaction with hydrazine to remove the phthalimide group and subsequent reaction with a C$_1$–C$_6$ alkyl group having a before-described leaving group. Where only a single C$_1$–C$_6$ alkyl group is desired, the free primary amine provided after reaction with hydrazine can be blocked with a removable blocking group such as t-butoxycarboryl (BOC) group prior to alkylation followed by removal of the BOC group to provide a desired secondary amine. A desired R$^3$ group can be similarly prepared.

It is also to be noted that although it is generally easier to prepare desired separation particles from a single PEG compound, even though that compound may itself be a mixture, one can also prepare useful separation particles using PEG compounds of quite different chain lengths. The values of n for separation particles containing PEG compounds of very different chain lengths nonetheless are about 15 to 225.

For example, separation particles referred to herein as 107–5750 were prepared by first reacting Merrifield's peptide resin particles with PEG-5000 methyl ether to form 107–5000 separation particles. Those separation particles were then reacted with PEG-750 methyl ether to form 107–5750 separation particles. The 107–5000 separation particles exhibited a higher D$_w$ value for TcO$_4^{-1}$ ions than did the 107–5750 separation particles.

The amount of a PEG compound present on the surface of a separation particle is provided by the percent CH$_2$O/mm$^2$ of particle surface area value. That value is typically greater than about 8,000 and less than about 1,000,000, and is preferably greater than about 9,000 and less than about 20,000, particularly for the particularly preferred separation particles prepared from 200–400 mesh Merrifield's peptide resin particles. Larger values are provided where still smaller particles such as the 5 micron average diameter silica gel particles are used.

The percent CH$_2$O/mm$^2$ of particle surface area (CH$_2$O/mm$^2$) value is readily calculated using $^{13}$C NMR integrals and the average particle surface area in mm$^2$. $^{13}$C Resonances for carbon atoms adjacent to an etherial oxygen differ from those for carbon atoms adjacent to other carbons or other elements.

Thus, using the particularly preferred Merrifield's peptide resin-based separation particles as illustrative, one can determine the solid $^{13}$C NMR spectrum and determine a ratio of the number of CH$_2$O carbons to those provided by the initial resin. Multiplication of that ratio by 100 percent and division by the average particle surface area provides the CH$_2$O/mm$^2$value. The exemplary CH$_2$O/mm$^2$ values utilized hereinafter are based upon the surface area of 400 mesh particles. Similar solid phase $^{13}$C NMR determinations can be carried out using separation particles prepared using the other before-discussed particles.

As noted previously, the separation particles are hydrophilic; i.e., wettable. Wettability of useful separation particles can be quantitatively approximated by calculation of a dry weight conversion factor (WCF) value for the particles. This value is approximate because for those separation particles that are only slightly wettable, the calculations involve small differences between large numbers, and even slight separation particle losses during manipulations can have a major impact upon the calculated WCF value. Nonetheless, WCF values can be useful in further defining useful separation particles.

The WCF value for the separation particles is calculated by dividing the weight of dried separation particles by the weight of those particles after suspension in a specified aqueous medium under specified conditions followed by recovery and air-drying of those particles. These procedures are detailed hereinafter.

Useful separation particles typically exhibit WCF values of about 0.9 to about 0.01, with the particularly preferred separation particles exhibiting WCF values of about 0.1 to about 0.6. The particularly preferred 107–2000 and 107–5000 separation particles discussed hereinafter exhibited WCF values of about 0.32 and 0.37, respectively, indicating about 68 and 63 percents hydration, respectively, after air-drying. The useful, but less preferred 107–750 separation particles exhibited a WCF value of 1, indicating little, if any, post-drying hydration.

One illustrative chaotrope that has been examined extensively is the $TcO_4^{-1}$ anion. The $TcO_4^{-1}$ anion and its precursor $^{99}MoO_4^{-2}$ anion are used illustratively herein to exemplify various aspects of the present invention. It is to be understood, however, that the other chaotropic anions behave substantially identically in a contemplated process.

The capacity of the separation particles for $TcO_4^{-1}$ anions in mmoles/gram of separation particles has not been determined because of the high radiation danger in carrying out the studies needed to make the determination. Nevertheless, studies carried out using 107–5000 separation particles along with non-radioactive ammonium perrhenate ($NH_4ReO_4$), that although less soluble, behaves similarly to ammonium pertechnetate under the conditions of a process contemplated herein, in the presence of 2.31 molal $(NH_4)_2SO_4$ at 25° C. indicate that the separation particles can separate and retain at least about 1 mmole/gram of $NH_4TcO_4$. Thus, the distribution value, $D_w$, for $TcO_4^{-1}$ ion in the presence of $10^{-5}$–$10^{-3}$ M $ReO_4^{-1}$ was substantially unchanged.

The above-described separation particles are contacted with an aqueous solution that contains at least two components: (i) chaotropic anion and (ii) a poly(ethylene glycol) liquid/liquid biphase forming amount of a dissolved salt.

All technetium isotopes are radioactive, whereas only some molybdenum isotopes are radioactive. Thus, the word radioactive is usually not used as a modifier for technetium, whereas it is used with molybdenum as appropriate to a given circumstance.

As noted previously, the precursor for the most preferred technetium isotope, $^{99m}Tc$, is $^{99}Mo$, which can be formed by neutron activation of $^{98}Mo$ or as a fission product of $^{235}U$. The half-life of $^{99}Mo$ is about 66 hours, so little $^{99}Mo$ remains about twenty-eight days (about 672 hours) after $^{99}Mo$ is formed.

Of the two $^{99}Mo$ sources, the fission product material typically can be obtained as a highly radioactive mixture that is difficult to work with, but can provide relatively large amounts of $^{99m}Tc$. The molybdate from $^{235}U$ fission is all radioactive $^{99}MoO_4^{-2}$. The neutron activated source typically has lower concentrations of both $^{99}Mo$ and $^{99m}Tc$ in solution with a relatively large quantity of non-radioactive molybdenum, $^{98}Mo$. This latter source of $^{99}Mo$ and $^{99m}Tc$ has typically been uneconomical to use because of the relatively low concentration of radionuclides present and the relatively high concentration of non-radioactive $MoO_4^{-2}$ ($^{98}MoO_4^{-2}$) ions. The present separation process can use either source of $^{99m}Tc$, and provides economic viability for recovery of $^{99m}Tc$ from $^{99}Mo$ produced by neutron activation irradiation of $^{98}Mo$.

The $MoO_4^{-2}$ and $TcO_4^{-1}$ anions are present in solution along with appropriate cations, although other than providing charge neutralization and water solubility, the cation is of little importance here. The presence of a cation is therefore to be presumed whenever $MoO_4^{-2}$ anion or $TcO_4^{-1}$ anion or any other anion is recited. Exemplary cations include the ammonium ion or alkali metal cations such as lithium, sodium or potassium ions. Most polyvalent cation molybdates are too insoluble for use, with magnesium molybdate exhibiting a low solubility of about 14 grams/100 mL of water at 25° C. Ammonium, sodium and potassium cations are most preferred. The cation of the recovered $TcO_4^{-4}$ anions or any chaotrope is that of the stripping solution or other last salt-containing aqueous solution to contact the chaotropic anion-bound separation particles simply as a result of concentration-dependent exchange and mass action.

The next component of the aqueous solution is a poly (ethylene glycol) liquid/liquid biphase-forming amount of a dissolved salt or lyotrope that is discussed hereinafter. As noted previously, it is well known that particular dissolved salts at particular concentrations and temperatures cause aqueous solutions of relatively high molecular weight poly (ethylene glycols) to form a liquid/liquid biphase; i.e., two distinct immiscible layers within the composition, in which one layer is relatively rich in PEG and the other is relatively rich in salt. This phenomenon is often referred to as salting out the PEG.

The liquid/liquid biphase formation is caused by the presence of water-soluble salts whose anion is principally responsible for the biphasic system. In addition, some salts that can form in situ such as molybdate salts of copper, zinc and iron(II), whose sulfate salts can otherwise be used to form a liquid/liquid biphase, are insoluble so some care should be exerted in selecting salts used herein. Thus, the before-mentioned ammonium and alkali metal ions are often the cations of choice with a given anion so that $MoO_4^{-2}$ salts or other salts that can form do not precipitate. Precipitation with other cations can be minimized by pH value adjustment as is well known for individual salts.

Keeping the molecular weight and concentration of the PEG constant, aqueous liquid/liquid biphase formation is generally favored by increasing salt concentration to the point of saturation, and increasing temperature between 20° and 60° C. At a constant concentration of a salt and temperature, aqueous liquid/liquid biphase formation is favored by increasing PEG molecular weight, although aqueous liquid/liquid biphase formation is not observed with a PEG having a molecular weight of about 750 and lower.

The presence of an aqueous liquid/liquid biphase can be observed usually by an interface that forms between the two immiscible layers and/or by turbidity of the composition on mixing. The formulation of an analogous layering is presumed to occur in the aqueous environment surrounding the separation particles, but physical evidence for the existence of such formation has not been observed.

An indirect assay for the amount of an appropriate salt present in the aqueous solution is therefore used herein. That indirect assay is based on the observations (i) that salt concentrations that form aqueous poly(ethylene glycol) liquid/liquid biphases in solution are useful in a present process, and (ii) PEG-750 that does not form such a biphase when free in solution in the presence of a biphase-forming amount of salt can be used when present covalently linked to the surface of separation particles as the sole PEG compound present in the presence of that amount of salt.

Thus, an aqueous poly(ethylene glycol) liquid/liquid biphase-forming amount of a dissolved salt that is present in an aqueous solution used to contact the separation particles is an amount of a salt that causes a solution of PEG-2000 to form a biphase at a PEG-2000 concentration of about 4 to about 50 weight percent and at a temperature of 25° C. Several such salts and their concentrations are provided in Ananthapadmanabhan et al., *Langmuir*, 3:24–31 (1987). In addition, one can carry out a simple study by preparing a solution of 4 to about 50 weight percent PEG-2000 containing a desired concentration of a salt and determine whether biphase formation occurs at 25° C.

Exemplary lyotropic anions useful in providing an aqueous poly(ethylene glycol) liquid/liquid biphase form salts with ammonium or alkali metal cations, and are provided in Table 1 below.

TABLE 1

| Anion | Anion |
|---|---|
| Hydroxide | Chromate |
| Fluoride | Molybdate |
| Carbonate | Tungstate |
| Silicate | Orthovanadate |
| Sulfate | Thiocyanate |
| Phosphate | Thiosulfate |
| Dihydrogen phosphate | Fluorosilicate |
| Hydrogen phosphate | Orthosilicate |
| Formate | Hydroxyethane-1,1-diphosphonate* |
| Succinate | |
| Tartrate | Vinylidene-1,1-diphosphonate* |
| Citrate | |

*The -2, -3 and -4 anion forms; i.e., the protonated forms, are useful.

It is noted that $MoO_4^{-2}$ is an anion that can be used to form an aqueous poly(ethylene glycol) liquid/liquid biphase. That fact is particularly fortuitous where it is desired to form $^{99m}TcO_4^{-1}$ using neutron activation irradiation of non-radioactive $^{98}Mo$ because no other salt need be present to effect separation and recovery of the $^{99m}TcO_4^{-1}$ containing salt. Thus, one can irradiate enriched $^{98}Mo$ as the metal or trioxide with neutrons and then dissolve the irradiated material in base to form an aqueous poly(ethylene glycol) liquid/liquid biphase-forming amount of a $MoO_4^{-2}$ salt and then carry out a process contemplated here to separate and recover the pertechnetate decay product.

Similarly, natural tungsten (non-radioactive) can be irradiated with neutrons to form radioactive W-188 ($t_{1/2}=69$ days). Dissolution of the resulting radioactive tungsten metal to form $^{188}WO_4^{-1}$ anions provides an aqueous solution that forms $^{188}ReO_4^{-1}$ anions by first-order decay of the radioactive tungstate anions. As is seen from Table 1, above, ammonium and alkali metal tungstate salts are themselves aqueous poly(ethyleneglycol) liquid/liquid biphase-forming salts, so that no further salts need be added to the $^{188}WO_4^-$$_2/^{188}ReO_4^{-1}$ anion-containing solution in carrying out an contemplated process.

A further way to characterize an aqueous poly(ethylene glycol) liquid/liquid biphase-forming amount of a dissolved salt is that the concentration is about 0.05 molar to saturation, and the calculated Gibbs free energy of hydration ($\Delta G_{hyd}$) of the anion is less than about −300 kJ/mole. Exemplary calculated $\Delta G_{hyd}$ values can be found in Marcus, *J. Chem. Soc., Faraday Trans.*, 87: 2995 (1991).

Another measure of the salting-out character of a contemplated aqueous poly(ethylene glycol) liquid/ liquid biphase-forming salt is the before-discussed $B_i$-coefficient of the James-Dole equation for viscosity that is discussed in Y. Marcus, *Ion Solvation*, John Wiley & Sons, Ltd., New York, 1985 page 124 ff, values for which are provided in Table 5.13 therein. Those materials with a positive sign for the $B_i$-coefficient are lyotropic and cause biphase formation at the above concentrations, whereas those materials having a $B_i$-coefficient with a negative sign are chaotropes that are retained on the separation particles.

Biphase-formation is thus believed to be a function of the water-structure-making or lyotropic property of the salt used. See, P. Becher, *Dictionary of Colloid and Surface Science*, Marcel Dekker, Inc., New York, 1990 pages 95–96; Voet, *Chem. Rev.*, 20:169–179 (1937). The greater is the water-structure-making property, the more readily an aqueous poly(ethylene glycol) liquid/liquid biphase is formed. Those materials that exhibit water-structure-breaking or chaotropic properties are retained on the separation particles.

It is also to be noted that once an appropriate amount of an aqueous poly(ethylene glycol) liquid/liquid biphase-forming soluble salt (lyotrope) is present, other anions and cations can also be present, and mixtures of different biphase-forming salts can be used to provide a biphase-forming amount. Thus, non-biphase-forming anions such as nitrate and chloride can be present in the aqueous solution, and mixtures of biphase-forming anions such as hydroxide and carbonate can be used as the biphase-forming soluble salt.

The pH value of the above-discussed aqueous solution is between 0 and 14. Thus, the non-biphase-forming chloride and nitrate anions, as well as biphase-forming sulfate and phosphate anions can be present as their respective acids. At a pH value of 12, achievable by use of 0.01 molar hydroxide ion, the concentration of hydroxide ion if used alone is too low to form a desired biphase, so other anions such as carbonate, phosphate or sulfate are also utilized to provide an appropriate salt concentration.

Continuing with the process steps, the before-described separation particles are contacted with the before-described aqueous solution. This contacting is an admixing manipulation and can occur in any vessel. Thus, one can simply admix the separation particles and an aqueous solution in a laboratory vessel such as a beaker or flask. More preferably, the contacting is carried out in a chromatography column of an appropriate size for the contemplated separation. Thus, for separation and recovery of quantities of $^{99m}TcO_4^{-1}$ anions useful in medical diagnoses, one typically needs only to have a volume of about 0.5 to about 2 mL, whereas a volume of several liters can be used for separating a soft metal cation halide or pseudohalide complex such as a cadmium or bismuth chloride complex.

Chromatography columns are well known in the art and are generally cylindrical, have an inlet means for adding an eluting solvent at or near one end, an outlet means for egress of that solvent at or near the other end, and a means for maintaining the separation particles between the inlet means and outlet means. Such columns are made of a material that is inert to the materials that are therewithin; i.e., glass, plastic such as polypropylene, or stainless steel, and can be designed to operate in any position; i.e., vertically, horizontally, or in a coil. For most medical uses of the $^{99m}TcO_4^{-1}$ anion, a polypropylene 2 mL syringe case (the syringe without the plunger) or a chromatographic column, as are well known, held vertically with its wide end up for eluting solvent addition and using gravity flow of that eluting solvent and a Luer-lock attachment or other outlet means at the bottom is quite sufficient. The body of the syringe case can hold the separation particles in place between the open top and bottom, but it is preferred to use a glass or polypropylene frit or a small amount of glass wool on the inside of the case above and below the separation particles to maintain the separation particles in place.

Using a separation of chaotropic $TcO_4^{-1}$ anions from $MoO_4^{-2}$ anions as an exemplary separation and recovery process, the admixing of separation particles and $MoO_4^{-2}/TcO_4^{-1}$ anions-containing aqueous salt solution can take place with the separation particles being dry or wet with water or another aqueous solution prior to contact. It is preferred, however, that the separation particles be hydrated in an aqueous solution of a poly(ethylene glycol) liquid/liquid biphase-forming salt prior to that contacting (admixing). More preferably, that salt solution contains the same salt at about the concentration to be used for carrying out the process.

Where the contacting step is carried out in a laboratory vessel, the separation particles can be premixed with an appropriate aqueous salt solution, typically with some agitation, for a time period sufficient for dry separation particles to hydrate (swell). The separation particles are then recovered as by decantation of the liquid or by filtration, and are then admixed with the aqueous solution containing the $MoO_4^{-2}$ and $TcO_4^{-1}$ anions. Where the separation particles are within a chromatography column, a few free column volumes (fcv) of an appropriate aqueous salt-containing solution are preferably passed through the column prior to the contacting step. Regardless of the technique used, appropriate hydration typically requires only a few minutes.

The contacting forms a solid/liquid phase admixture. The contact is maintained for a time period sufficient for the $TcO_4^{-1}$ anions (chaotrope) to bind to the solid phase separation particles and form a liquid phase aqueous solution that contains $MoO_4^{-2}$ anions and is substantially free of $TcO_4^{-1}$ anions (chaotrope).

Rates of binding of various chaotropic anions such as $TcO_4^{-1}$ anions to separation particles have not been determined. However, binding is almost instantaneous or requires only a few minutes at most inasmuch as studies with chromatography columns have indicated that $TcO_4^{-1}$ anions do not co-elute with $MoO_4^{-2}$ anions as the latter anions emerge from the bottom of the columns during loading.

The liquid aqueous phase is substantially free of $TcO_4^{-1}$ anions because $^{99}MoO_4^{-2}$ anions have a first order decay to $TcO_4^{-1}$ anions so that at a given time, some $TcO_4^{-1}$ anions may be formed that are not or have not bound to the separation particles and can be present in the liquid aqueous phase. This wash or rinse step is carried out so that impurities remaining in the interstitial volume of the column are removed prior to stripping of the chaotropic anion so that a higher parity product can be obtained. For example, in a chromatography situation, an aqueous eluate containing $^{99}MoO_4^{-2}$ anions will have increasing amounts of $TcO_4^{-1}$ because of the decay of $^{99}MoO_4^{-2}$ anions. Those amounts are, usually, vanishingly small if present at all at a time within a few minutes of elution. Aside from the above situations where the chaotrope is or can be made in situ, little of the chaotropic anion is present free in solution so long as the capacity of the separation particles is not exceeded.

The solid phase of the $TcO_4^{-1}$ anion-bound separation particles are separated from the $MoO_4^{-2}$ anion-containing liquid phase formed during the maintenance step. This separation is carried out while maintaining the $TcO4^{-1}$ anion-bound separation particles in the presence of an aqueous solution of a poly(ethylene glycol) liquid/liquid biphase-forming amount of a salt.

In a process utilizing a chromatographic column, the degree of this separation can be-enhanced by washing the column with an aqueous solution of the same poly(ethylene glycol) biphase-forming salt used during the separation step or washing with a solution of another such salt. This wash or rinse step is carried out so that impurities that may remain in the interstitial volume of the column are removed prior to stripping of the chaotropic anion so that a higher purity product can be obtained. For example, where the column is loaded using an aqueous solution of 5M NaOH as the biphase-forming salt solution, the column can be washed with more of that salt or one can use an aqueous solution containing 3M $K_2CO_3$. Such a wash step is preferred, but not required.

Where a laboratory or other vessel such as a flask or beaker is used for the process, the aqueous liquid phase formed after the maintenance step can be decanted off or separated by filtration or the like. That physical separation is preferably followed by one or more washes with aqueous salt solution as discussed above.

Regardless of the procedure used, a second solid/liquid phase admixture is preferably formed. That second solid/liquid phase admixture contains $TcO_4^{-1}$ anion-bound (chaotropic anion-bound) separation particles (solid phase) that are in the presence of an aqueous solution of a poly (ethylene glycol) liquid/liquid biphase-forming amount of a dissolved salt where a $TcO_4^{-1}/MoO_4^{-2}$ separation is carried out, the resulting aqueous solution is preferably free of $MoO_4^{-2}$ anions.

That second solid/liquid phase admixture can be used separately for subsequent recovery of the chaotropic anions. Thus, the separation of $MoO_4^{-2}$ and $TcO_4^{-1}$ anions can take place at one location, with the separated second solid/liquid phase admixture being shipped to a second location for use as in a medical diagnostic procedure. This second solid/liquid phase admixture is utilized at least for shipment within a closed container such as a vial, test tube or the like that itself is typically contained in a container that prevents leakage of radiation. In one preferred embodiment of this aspect of the invention, the second solid/liquid phase admixture is present within a chromatography column as the first-named container.

The separated $TcO_4^{-1}$ anions (chaotropic anions) are freed from their bound state by contacting (admixing) the $TcO_4^1$ anion-bound (chaotropic anions) separation particles with a second aqueous solution that does not contain a poly (ethylene glycol) liquid/liquid biphase-forming amount of a dissolved salt to free the $TcO_4^{-1}$ anions (chaotropic anions) from the separation particles and form an aqueous solution containing free $TcO_4^{-1}$ anions (chaotropic anions) along with their corresponding cations. Thus, a third solid/liquid phase admixture is formed where solid phase constitutes the hydrated separation particles.

Distilled or deionized water is a convenient second aqueous solution for this purpose. Also useful are sodium chloride solutions such as isotonic 0.9N NaCl solutions. The second aqueous solution can contain biphase-forming salts such as potassium carbonate and potassium phosphate, but the concentration of those salts is less than an aqueous poly(ethylene glycol) liquid/liquid biphase-forming amount. This second aqueous solution is sometimes referred to herein as a stripping solution because of its use to strip the chaotrope (e.g. $TcO_4^{-1}$ anions) from the separation particles.

The pH value of a stripping solution can be from about zero to about 14, but is more preferably about 6 to 8.

The aqueous solution containing free chaotropic anions ($TcO_4^{-1}$ anions) is then recovered.

In a chromatographic environment, one can simply wash the column containing the separation particle-bound chaotropic anions ($TcO_4^{-1}$ anions) with the desired second aqueous solution, and then collect the eluate. As is seen from FIGS. 12, 13, 17 and 18 elution of the previously bound $TcO_4^{-1}$, $I^-$ and $IO_3^-$ anions can be quite sharp. Where the separation is carried out in a laboratory or other vessel, one can simply wash (contact and mix) the appropriate separated solid phase with the second aqueous solution and then collect the resulting liquid phase as by filtration or decantation.

As noted earlier, the technetium isotope usually used in medical diagnostics is $^{99m}Tc$ that has a relatively short half-life of about 6 hours. Additionally, $^{99}Mo$, from which $^{99m}Tc$ and $^{99}Tc$ arise, also has a relatively short half-life of only about 66 hours. Thus, both $^{99m}Tc$ and $^{99}Mo$ have decayed to $^{99}Tc$ within about twenty-eight days of their manufacture.

On the other hand, $^{99}Tc$ has a half-life of about $2 \times 10^5$ years, and once made, remains a radiation hazard. This form of technetium, $^{99}Tc$, is present in a number of nuclear wastes from which it would be desirable to be separated.

These wastes, such as those at the Westinghouse Hanford facility, contain $^{99}Tc$ as aqueous $TcO_4^{-1}$ salts and are typically free of $MoO_4^{-2}$ anions. In particular, these wastes contain a sufficient concentration of biphase-forming salts (typically NaOH) to permit separation and recovery of $^{99}TcO_4^{-1}$ anions without adding a further lyotropic salt. The present invention also provides a process for separating and recovering $TcO_4^{-1}$ anions from these and other aqueous solutions, regardless of the presence of $MoO_4^{-2}$ anions.

A before-described process is typically carried out at ambient room temperature. However, such a process can also be carried out at any temperature above the freezing point and below the boiling point of the aqueous solutions utilized. A contemplated process is typically carried out at ambient atmospheric pressure, but can also be carried out at an elevated pressure.

Results

Reaction of the sodium alkoxide of poly(ethylene glycol 2000 methyl ether) (Me-PEG-2000) with a chloromethylated polystyrene (with 1 percent divinylbenzene cross-linking; Aldrich Chemical Co.), also referred to as Merrifield's peptide resin, afforded a dirty white material. The reacted Merrifield's peptide resin [cross-linked poly(styrene-co-vinyl benzyl chloride)] was no longer a free flowing solid like the precursor beads, however, the new material maintained a resin-like consistency. When contacted with water the material was evenly dispersed and readily hydrated. Gravimetric analysis revealed a dry weight conversion factor of 0.316 (or 68.4 percent water) for the Me-PEG-2000 modified material, indicating extensive wettability and a high potential for aqueous biphasic behavior. Uptake studies for pertechnetate from a variety of biphase-forming salt solutions showed high weight distribution ratios and will be discussed below.

Four other polystyrene-based chromatographic materials were prepared with the monomethyl ether derivatives of PEG-350, PEG-750, PEG-5000, and PEG-5000+PEG-750, with most of the work being done with monomethyl ethers of PEG-350, -750, -2000 and -5000. These materials were synthesized to investigate the influence of PEG molecular weight on metal ion partitioning and aqueous biphasic behavior. These resins were prepared in a manner identical to that for Me-PEG-2000, and all afforded dirty white bead-like solids. Separation particles prepared using Me-PEGs having molecular weights of 350, 750, 2000, 5000 and both 5000 and 750 are named 107–350, 107–750, 107–2000, 107–5000 and 107–5750 respectively.

A number of metal cations including $Na^+$, $Cs^+$, $Ca^{+2}$, $Sr^{+2}$, $Mn^{+2}$, $Co^{+2}$, $Cd^{+2}$ and $Tl^{+1}$ were assayed for retention by 107–2000 from both water and 5.05 molal (m) $(NH_4)_2SO_4$. None of the above metal cations was retained by the material, and this is in keeping with their behavior in liquid/liquid aqueous biphasic separations where none of those metals partitions to the PEG-rich phase. Because the pertechnetate anions partition to the PEG-rich phase in liquid/liquid aqueous biphasic systems without the aid of an extractant, [Rogers et al., Solvent Extr. Ion Exch., (in press 1995); Rogers et al., In Aqueous Biphasic Separation: Biomolecules to Metal Ions; Rogers and Eiteman, eds; Plenum: New York, 1995; in press; Rogers et al., Solvent Extr. Ion Exch., (in press 1995); Rogers et al., Sep. Sci. Technol., 28:1091 (1993)] that ion was used as a probe for biphasic character.

Weight distribution ratios for $TcO_4^{-1}$ have been determined from $(NH_4)_2SO_4$, $K_2CO_3$, $K_3PO_4$, and NaOH solutions as exemplary. These salts are known as liquid/liquid biphase forming anions and cover a broad range of chemical characteristics.

Weight distribution ratios for $TcO_4^{-1}$ anions onto unmodified chloromethylated polystyrene-1-percent-divinylbenzene from both water and 5.05 m $(NH_4)_2SO_4$ were near unity. Pertechnetate retention by 107–2000 from water was extremely low affording a $D_w$ of only 8.7.

The amount of solute on the separation particles is determined by a difference method and therefore $D_w$ values less than one are difficult to obtain due to error inherent in the assay method. $D_w$ values less than 20 generally indicate little if any retention. A $D_w$ value of about 200 is maximally observed in a liquid/liquid extraction of $TcO_4^{-1}$ ions in NaOH using 20–70 weight percent aqueous PEG-2000.

FIG. 1 shows $D_w$'s for $TcO_4^{-1}$ anions with 107–350 at 25° C. using the before-mentioned four liquid/liquid biphase forming salts. All of the weight distribution ratios were below ten and indicated no retention of pertechnetate by these potential separation particles. The dry weight conversion factor for this material is 1.0, meaning that it is not hydrated within the limits of this measurement. In fact, this material behaves very similarly to the unmodified chloromethylated polystyrene-1-percent-divinylbenzene. Both materials had extremely low wettabilities, are not evenly dispersed in water, and consequently show no aqueous biphasic partitioning behavior.

Figure 2:
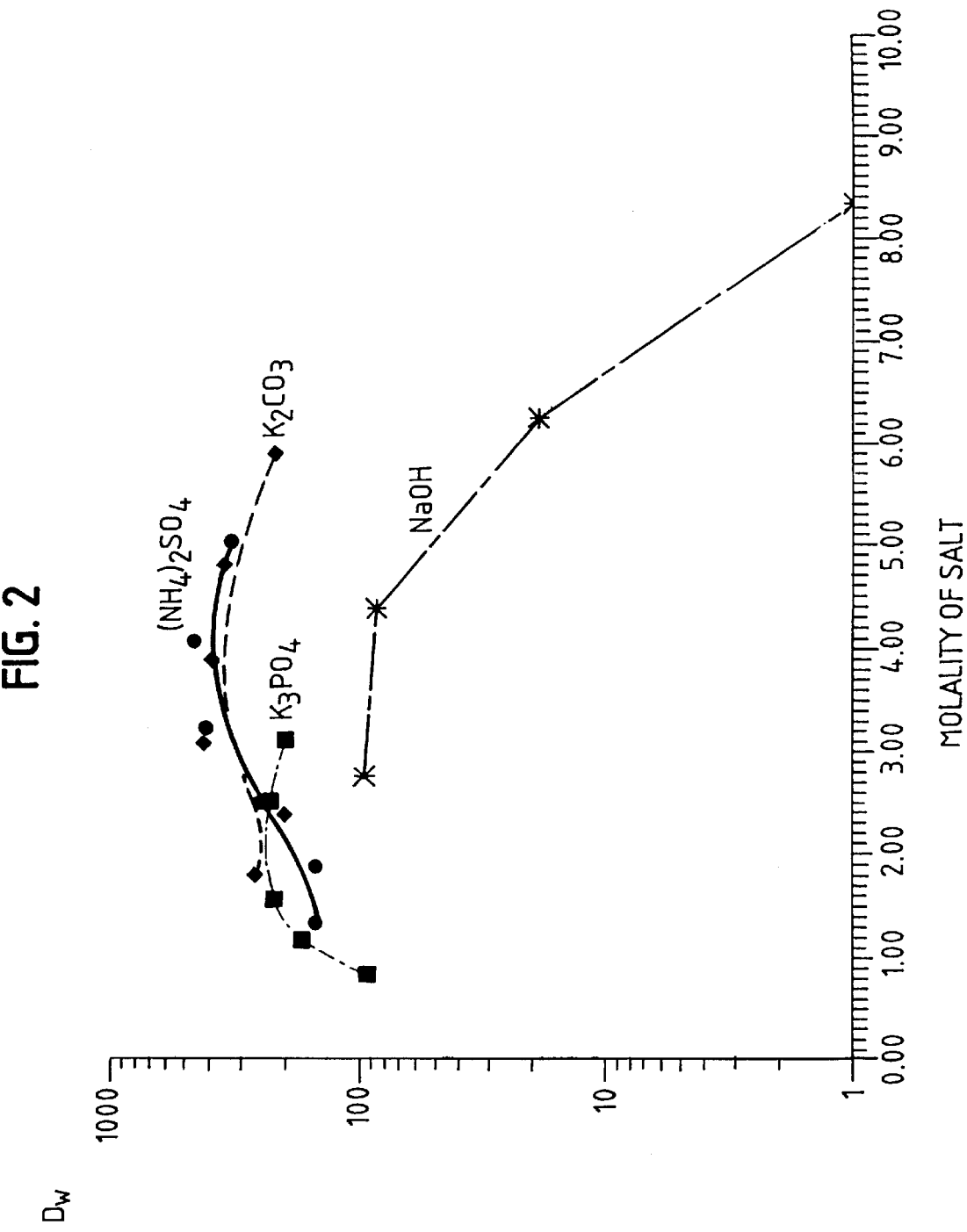
FIG. 2 is a graph similar to the graph of FIG. 1 using 107–750 separation particles. Data are presented as in FIG. 1 except that data obtained using K$_3$PO$_4$ are shown as darkened squares and those obtained using (NH$_4$)$_2$SO$_4$ are shown as darkened circles.

Separation particles 107–750 showed an appreciable increase in $TcO_4^{-1}$ anions distribution with a maximum $D_w$ of 460 at 4.08 m $(NH_4)_2SO_4$ (FIG. 2). Pertechnetate retention started low, maximized, and then tailed from $PO_4^{-3}$, $CO_3^{-2}$, and $SO4^{-2}$ solutions. Sodium hydroxide afforded the lowest weight distribution ratios that sharply decreased from a maximum $D_w$ of 96 at 2.78 m NaOH.

Separation particles 107–750, like 107–350, had a dry weight conversion factor of 1.0. Although not as hydrophobic as 107–350, this material dispersed evenly in water and is useful, but difficult to handle because it has a gummy consistency.

Figure 3:
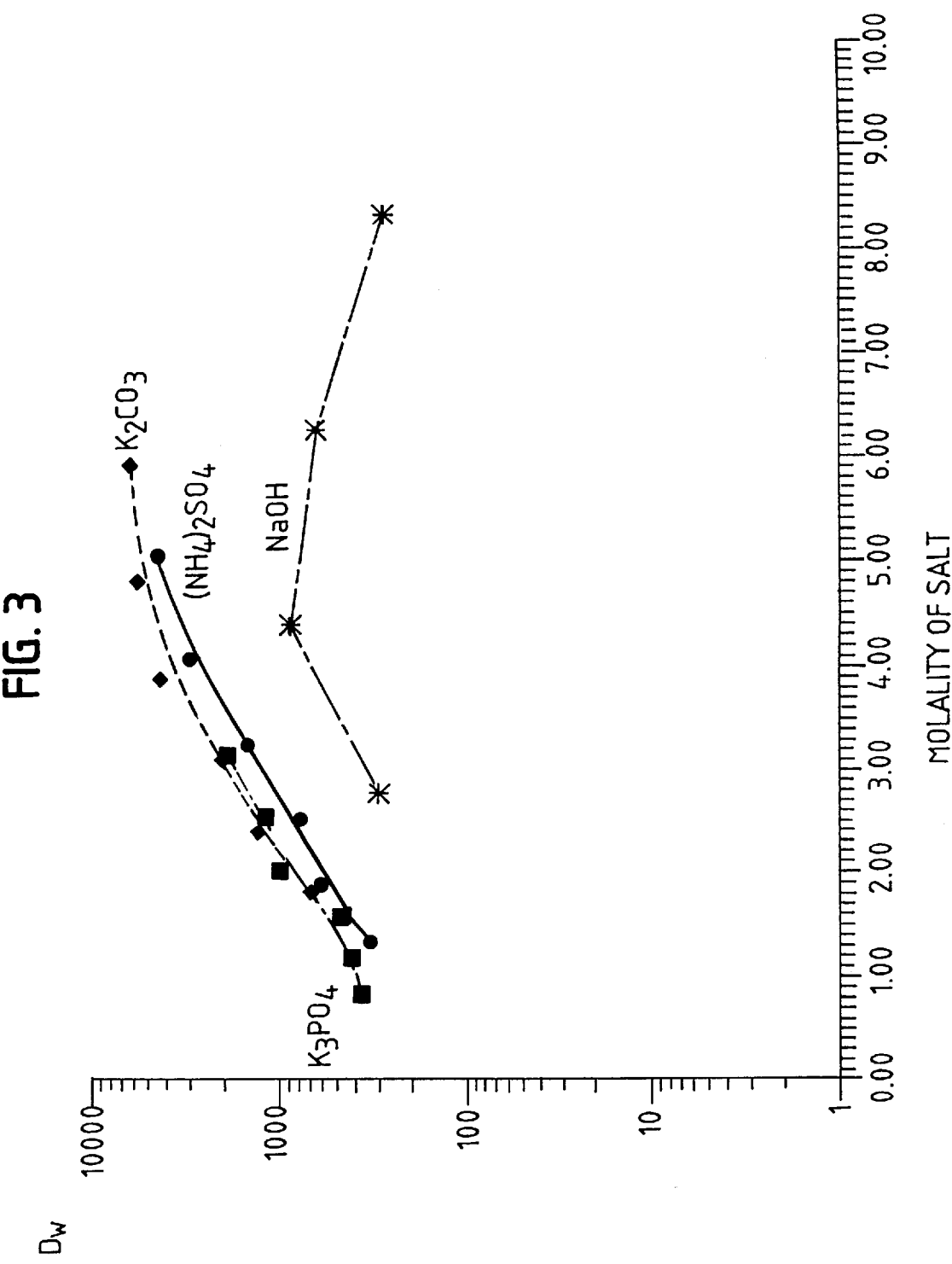
FIG. 3 is a graph similar to the graph of FIG. 2 using 107–2000 separation particles. Data obtained using the four salts are shown as in FIG. 2.

Separation particles 107–2000 were the first material to show a behavior similar to aqueous biphasic partitioning. The potential of this material was suggested by its dry weight conversion factor, which indicated a 68.4 percent water content. From high ionic strength solutions, weight distribution ratios were quite high as depicted in FIG. 3. The highest $D_w$ values were 4500, 6200, 1900, and 880 from 5.05 m $(NH_4)_2SO_4$, 5.92 m $K_2CO_3$, 3.14 m $K_3PO_4$, and 4.41 m NaOH, respectively. $D_w$'s from sodium hydroxide peaked at an intermediate salt concentration (4.41 m) and then began to decrease. The remaining salts all showed a reasonable increase in weight distribution ratios, with $K_2CO_3$ affording the highest $D_w$ values.

Figure 4:
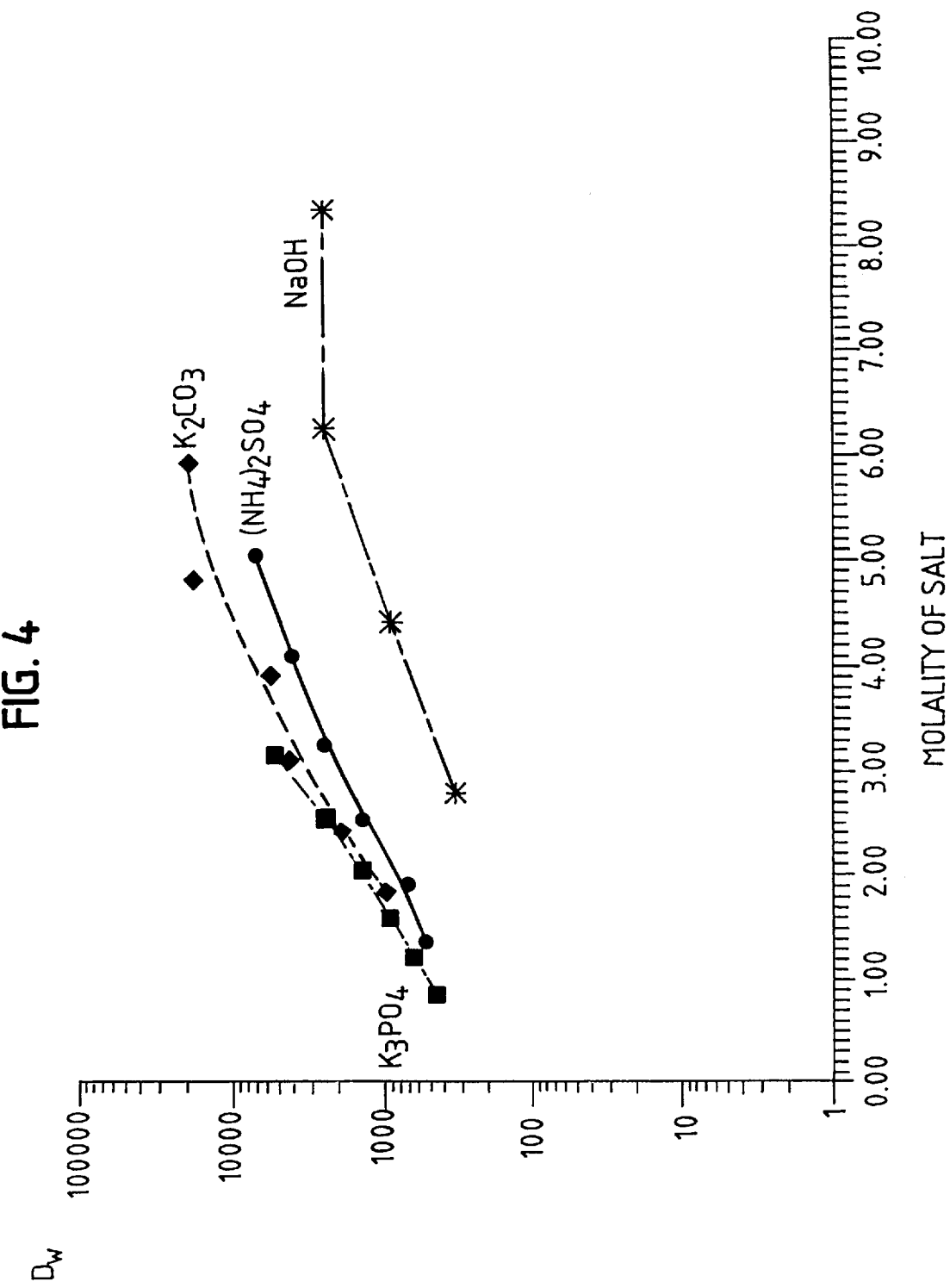
FIG. 4 is a graph similar to the graph of FIG. 2 using 107–5000 separation particles. Data obtained using the four salts are shown as in FIG. 2.

FIG. 4 depicts $D_w$ values for $TcO_4^{-1}$ aeons using 107–5000. These weight distribution ratio profiles have the same general features as observed for 107–2000, except that there is an increase in $D_w$ for $TcO_4^{-1}$ anions from NaOH rather than the intermediate maxima observed for 107–2000. This behavior is not well understood. The maximum weight distribution ratios are 7000, 19000, 5200 and 2500 from 5.05 m $(NH_4)_2SO_4$, 5.92 m $K_2CO_3$, 3.14 m $K_3PO_4$, and 8.33 m NaOH, respectively. These values are about two to three times those obtained with 107–2000, with the maximum $D_w$ values from the $K_2CO_3$ solution as observed for 107–2000. Interestingly, the dry weight conversion factor of 0.374 for 107–5000 was higher than that for 107–2000, indicating a lower water content.

Figure 5:
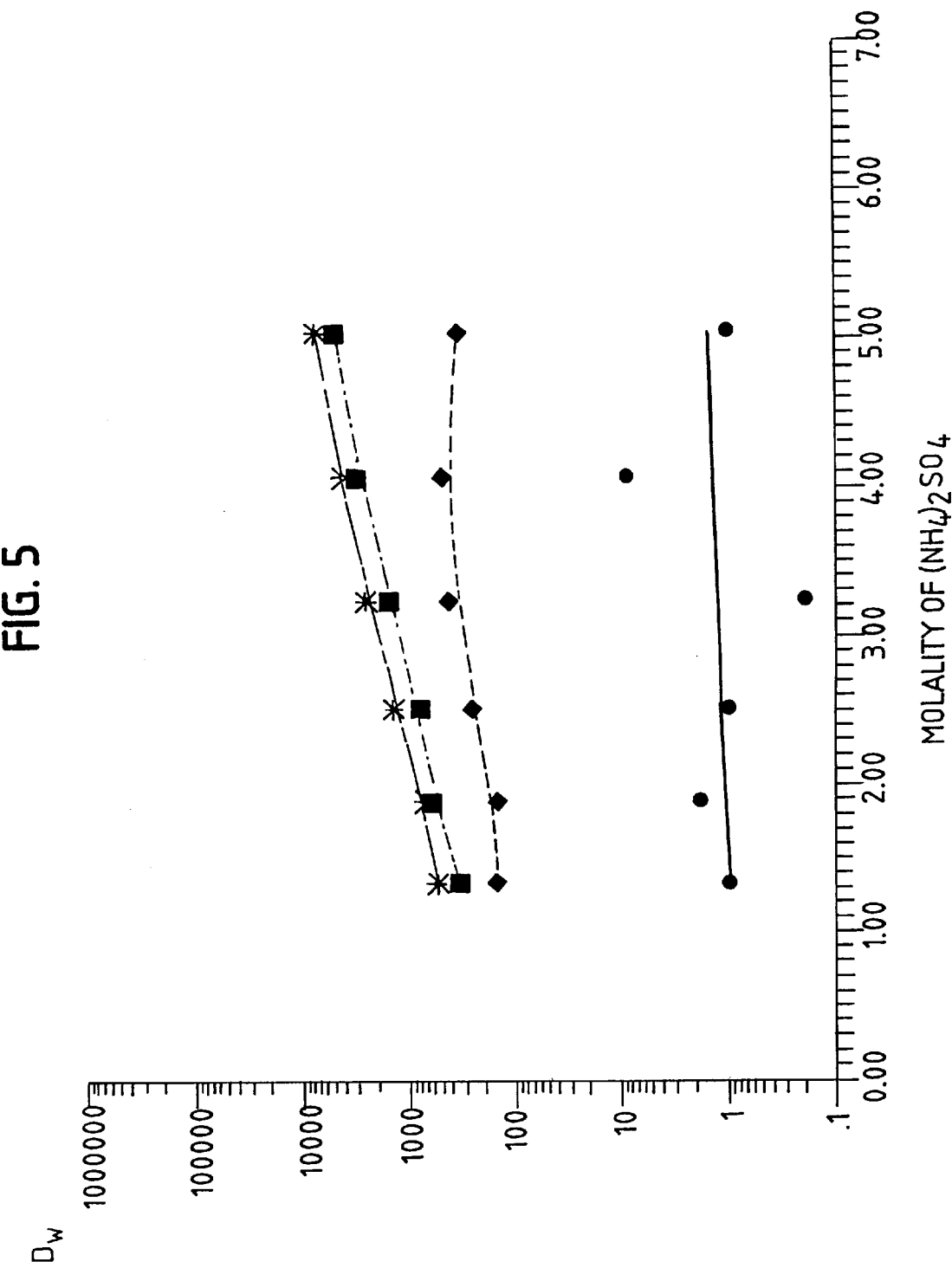
FIG. 5 is a graph of D$_w$ values for TcO$_4^{-1}$ ions versus the molality of (NH$_4$)$_2$SO$_4$ on the abscissa using four separation particle types at 25° C. Data for 107–5000 separation particles are shown as stars, data for 107–2000 separation particles are shown as darkened squares, data for 107–750 separation particles are shown as darkened diamonds, and data for 107–350 separation particles are shown as darkened circles.

FIG. 5 shows $D_w$ for $TcO_4^{-1}$ anions vs. molality of $(NH_4)_2SO_4$ for the four different molecular weight resins. Weight distribution ratios for 107–350 are extremely low, whereas 107–750 was two orders of magnitude higher, but still showed a relatively flat slope. Separation particles 107–2000 and 107–5000 $D_w$ values increased steadily as the molality of $(NH_4)_2SO_4$ increased, reaching 7000 for 107–5000 at 5.05 m.

Figure 6:
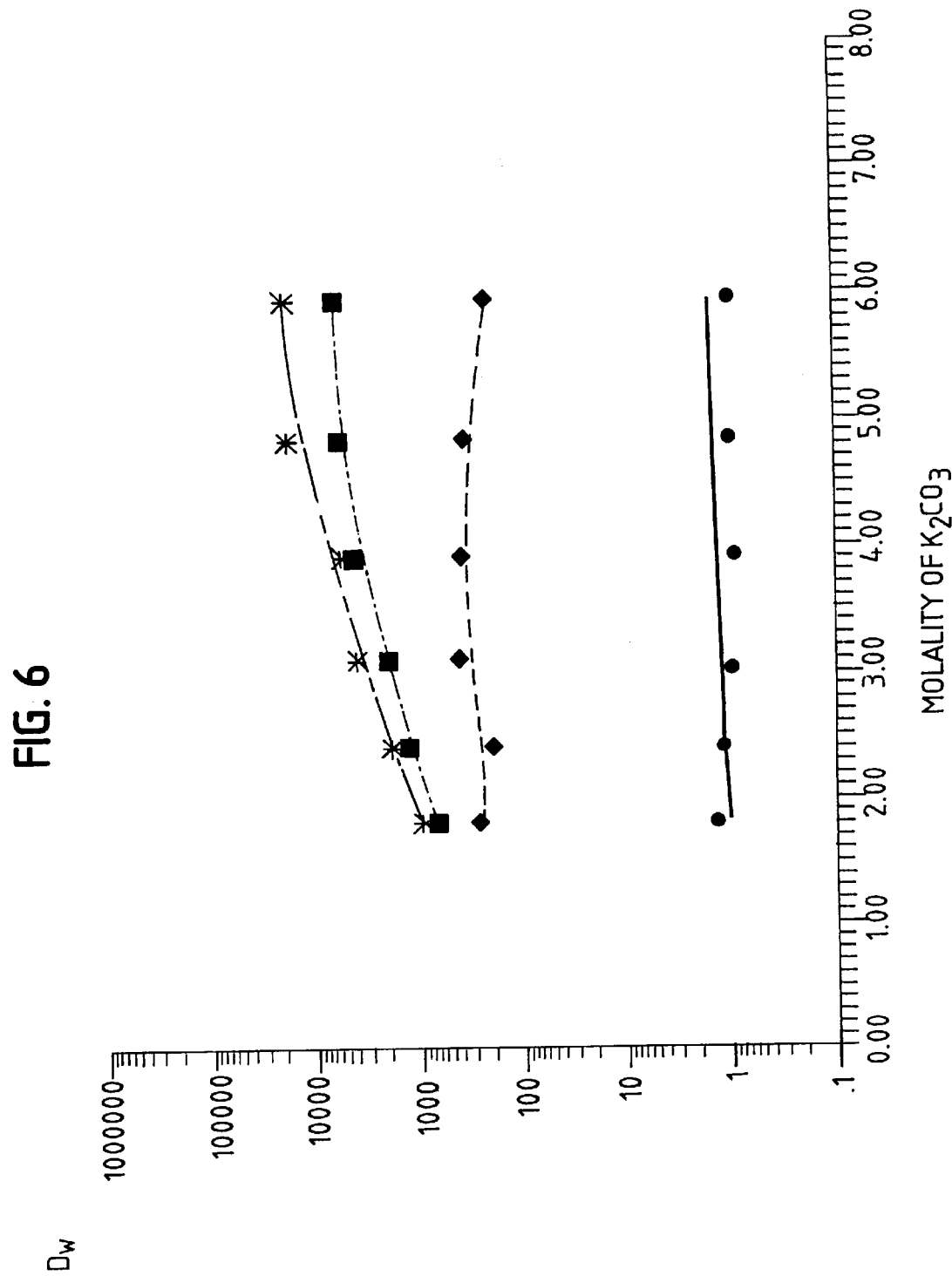
FIG. 6 is a graph similar to that of FIG. 5 except that molality of K$_2$CO$_3$ is shown on the abscissa.

FIG. 6, $D_w$ for $TcO_4^{-1}$ anion vs. molality of $K_2CO_3$, showed the broadest range in weight distribution ratios for the four aqueous biphasic resins. The span covered four orders of magnitude from the low around unity for 107–350 to the maximum of 19000 at 5.92 m $K_2CO_3$ for 107–5000. The profiles for 107–350 and 107–750 in $K_2CO_3$ resembled those from $(NH_4)_2SO_4$, although the $D_w$ values for 107–750 were somewhat lower in this basic media. Contrasting this behavior are 107–2000 and 107–5000 that have weight distribution ratios for pertechnetate in $CO_3^{-2}$ solutions about twice those from the ammonium sulfate systems. $D_w$ values for the two highest molecular weight PEG 107 materials also climbed more rapidly in $K_2CO_3$ than in $(NH_4)_2SO_4$, however a leveling of the slopes above 4.82 m $K_2CO_3$ was noted.

Figure 7:
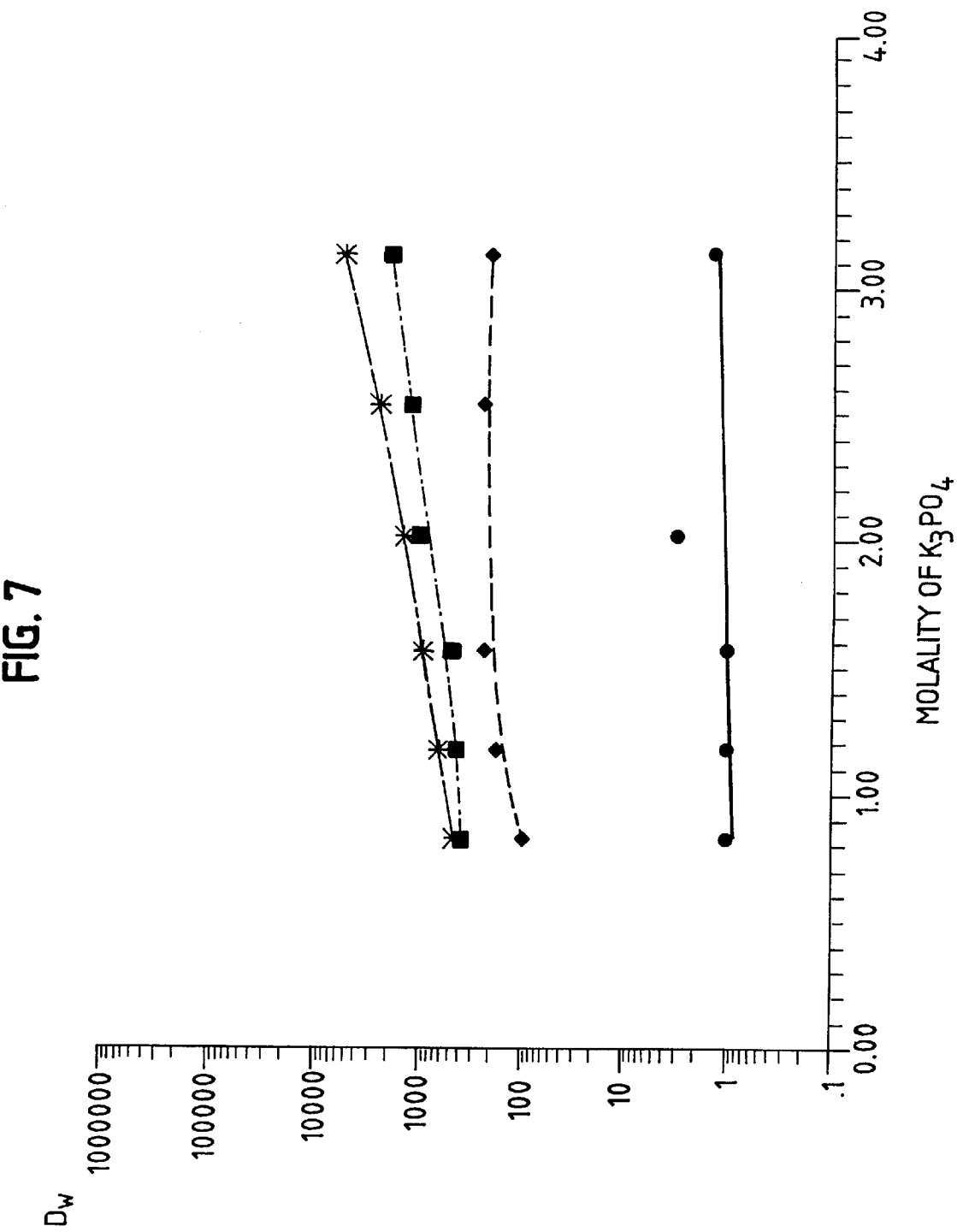
FIG. 7 is a graph similar to that of FIG. 5 except that molality of K$_3$PO$_4$ is shown on the abscissa.

$K_3PO_4$ solutions afforded weight distribution ratio profiles that mimicked $(NH_4)_2SO_4$, but at significantly lower concentrations of salt. FIG. 7 depicts the efficiency of the four 107 resins for $TcO_4^{-1}$ anion retention from $K_3PO_4$ solutions.

Once again, 107–350 and 107–750 had low weight distribution ratios and essentially flat profiles. $D_w$ values with 107–2000 and 107–5000 climbed steadily to their respective maxima of 1900 and 5200 at 3.14 m $K_3PO_4$. As with $(NH_4)_2SO_4$, no leveling of the $D_w$ profiles occurred in $K_3PO_4$. Around 3 m salt the weight distribution ratios are comparable for 107–2000 (3.14 m $K_3PO_4$, $D_w$=1900; 3.24 m $(NH_4)_2SO_4$, $D_w$=1500).

Figure 8:
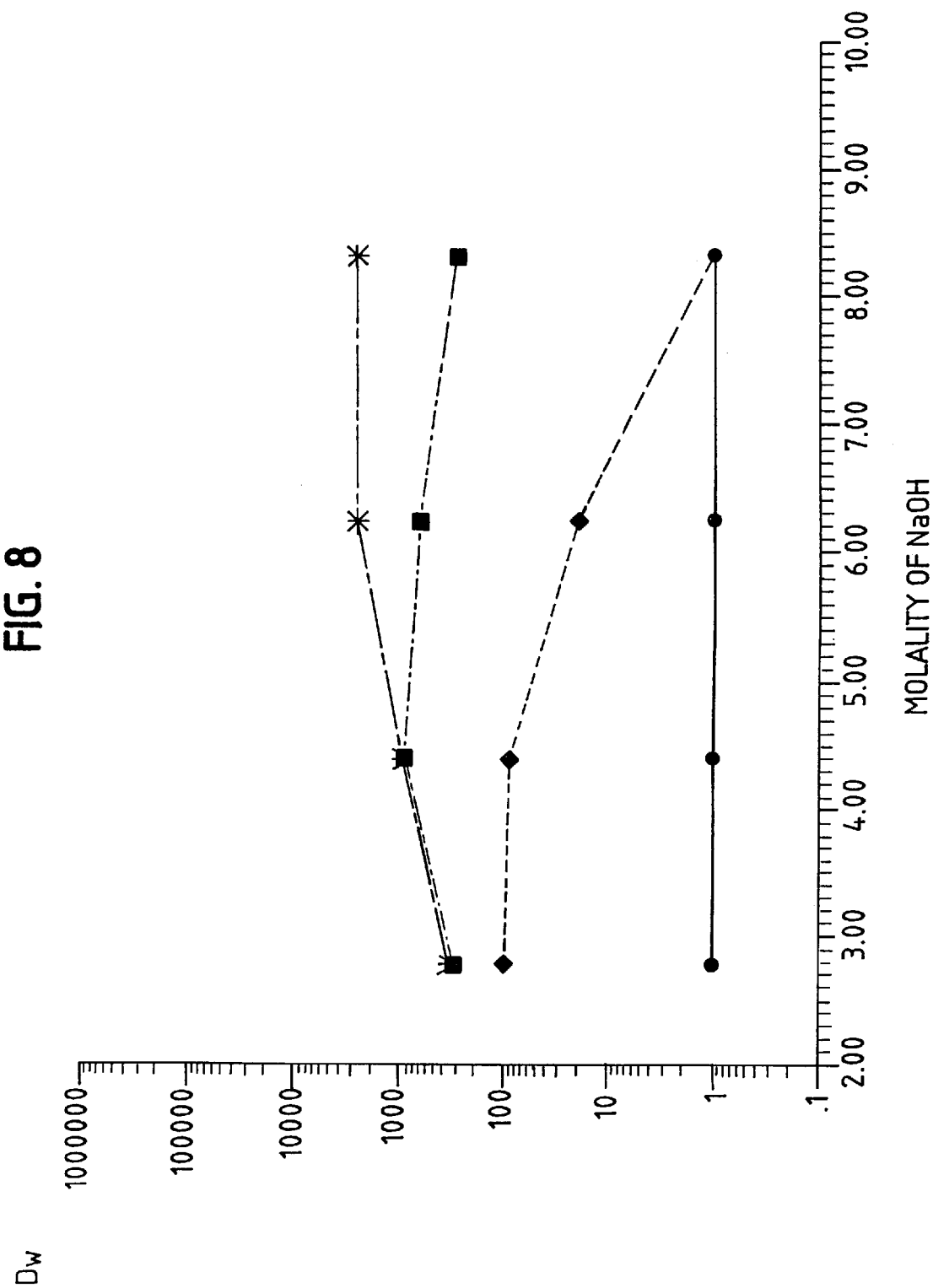
FIG. 8 is a graph similar to that of FIG. 5 except that molality of NaOH is shown on the abscissa.

Sodium hydroxide afforded the lowest $D_w$ values of all the salt systems studied. FIG. 8 plots $D_w$ for $TcO_4^{-1}$ anion vs. molality of NaOH and shows some unique behavior. 107–750 $D_w$ values started around 100, as they did for the other three salts, however a steady decrease down to $D_w$=1 occurred in NaOH. A tailing and leveling, respectively, were observed for 107–2000 and 107–5000 above 6.25 m NaOH. This behavior is not yet understood, but the basic $K_2CO_3$ solutions showed a similar leveling effect that was not observed in the weakly acidic $(NH_4)_2SO_4$ solutions.

The four phase-forming salts utilized in these studies encompass a broad range of chemical characteristics. The pH value range varies from around 4–5 for $(NH_4)_2SO_4$ to 14 for NaOH, and from chemically inactive ($SO_4^{-2}$, $CO_3^{-2}$, $PO_4^{-3}$) to extremely caustic ($OH^-$). These salts also represent a series of mono-, di-, and trianionic aqueous liquid/liquid biphase-forming anions that cover a broad concentration range.

Pertechnetate distribution was exceedingly low for 107–350 particles. Consequently, the following discussion about the partitioning behavior in the above four salt solutions is limited to 107–750, 2000, and 5000 separation particles.

FIGS. 2–4 illustrate the relative orderings of weight distribution ratios as a function of salt concentration. In each case, $K_3PO_4$ was capable of binding (salting out) the pertechnetate anion to the separation particles at the lowest salt concentration, and at higher molalities $(NH_4)_2SO_4$ and $K_2CO_3$ afforded the highest weight distribution ratios. In the approximate range 1.8–3.1 m $K_2CO_3$, $(NH_4)_2SO_4$, or $K_3PO_4$, pertechnetate distribution is roughly equivalent on each modified resin. The monovalent hydroxide anion is the least efficient medium for pertechnetate extraction, nonetheless a maximum weight distribution ratio of 2500 was obtained using 107–5000 separation particles.

FIGS. 5–8 show one of the most important variables affecting pertechnetate distribution; i.e., the molecular weight of the polyether. Particles 107–350 performed poorly in each of the four salt solutions, whereas separation particles 107–750 were in the middle and 107–2000 and 107–5000 (average n=about 44 and 113, respectively) performed much better and quite similarly. The molecular weight of the polymer had an obvious affect on solute distribution in these solid/liquid separations, and this is in keeping with results from liquid/liquid separations. [Rogers et al., *Solvent Extr. Ion Exch.*, (in press 1995); Rogers et al., in *Aaueous Biphasic Separation: Biomolecules to Metal Ions*, Rogers and Eiteman, eds., Plenum, New York. (1995) in press; Walter et al., *Aqueous Two-Phase Systems*, in *Methods in Enzymolocy*, Academic Press, San Diego, Vol. 228 (1994); Albertsson, *Partition of Cell Particles and Macromolecules*, 3rd ed., John Wiley & Sons, N.Y. (1986); *Partitioning in Aqueous Two-Phase Systems, Theory, Methods, Uses and Applications in Biotechnology*, Walter et al., eds., Academic Press, Orlando (1991)]

In order for an aqueous biphase to form in the liquid/liquid mode, the molecular weight of the PEG must be high enough so that it can-be salted out by a sufficient concentration of biphase-forming salt. This observation suggests a dependence on the molecular weight of the Me-PEG polymer used illustratively here, but does not predict the weight distribution ratios in excess of 100 for 107–750 separation particles, (PEG's of this molecular weight do not form heterogeneous two-phase systems in the liquid/liquid mode at ambient temperature), nor does it explain the similar behavior of 107–2000 and 107–5000 separation particles.

One explanation for the poor performance of the low molecular weight 107 materials can be found in their low wettabilities. Neither 107–350 particles nor 107–750 separation particles were hydrated within measurability after contact with water, whereas 107–2000 and 107–5000 separation particles were only 31.6 and 37.4 percent solid after hydration.

It is thus believed that if the Me-PEG is not suitably hydrophilic, is not capable of making the support suitably hydrophilic, and is also not of sufficient molecular weight to participate in a genuine aqueous biphasic interaction, its partitioning characteristics will be poor.

The unpredictably small difference in the $TcO_4^{-1}$ anion retention properties of 107–2000 and 107–5000 separation particles is not completely understood. One possible explanation centers on the amount of Me-PEG present on the support, and its location on the surface or within the pores of the material. The support material is a microporous polystyrene-1-percent-divinylbenzene copolymer with a mesh range of 200–400 (about 75–38 microns). Diffusion and grafting of Me-PEG into the pores is inevitable. However, the extent of grafting in the pores should decrease as the polymer molecular weight increases. Some electron microscopy and $^{13}C$ relaxation studies have been done on polystyrene bound ethylene oxide polymers [*Poly(Ethylene Glycol) Chemistry: Biotechnical and Biomedical Applications*, Harris, ed., Plenum Press, New York 1992]; and this work suggests a dual activity at the surface and in the pores.

Solid state NMR data on the four 107 materials and on the unmodified chloromethylated polystyrene-1-percent-divinylbenzene precursor showed a steady decrease in the ethylene oxide concentration for separation particles 107–750 through 107–5000. This finding is in keeping with the suggested decrease in grafting yields as the molecular weight of the PEG increases, [*Poly(Ethylene Glycol) Chemistry: Biotechnical and Biomedical Applications*, Harris, ed., Plenum Press, New York 1992] which is largely due to steric hindrance.

The finding that there is a higher concentration of Me-PEG on separation particles 107–2000 than 107–5000 lends some insight into the small difference in the partitioning behavior of these two chromatographic materials. Whereas the partitioning of metal ions in aqueous biphasic systems is enhanced by increasing PEG molecular weight, [Rogers et al., *Solvent Extr. Ion Exch.*, (in press 1995)] this trend may not rigorously hold in these solid-supported separations due to the steric hindrance imposed by the larger polymers that can lead to a decrease in surface (and pore) grafting yields. [*Poly(Ethylene Glycol) Chemistry: Biotechnical and Biomedical Applications*, Harris, ed., Plenum Press, New York 1992]

The higher Me-PEG concentration on 107–2000 separation particles is also in keeping with the dry weight conversion factor data. The higher polymer concentration on 107–2000 separation particles affords a slightly lower percent solid of 31.6 percent, opposed to the 37.4 percent solid for 107–5000 separation particles.

From these observations, Me-PEG-2000 is one particularly preferred choice for the grafting approach. Separations with 107–2000 separation particles are efficient in the aqueous liquid/liquid biphase-forming salts (as opposed to the low retention properties of 107–750 separation particles) and have reasonably high concentrations of Me-PEG-2000 on the resin. On the other hand, 107–5000 separation particles provided higher $D_w$ values, making Me-PEG-5000 separation particles another particularly preferred choice for the grafting approach.

Figure 9:
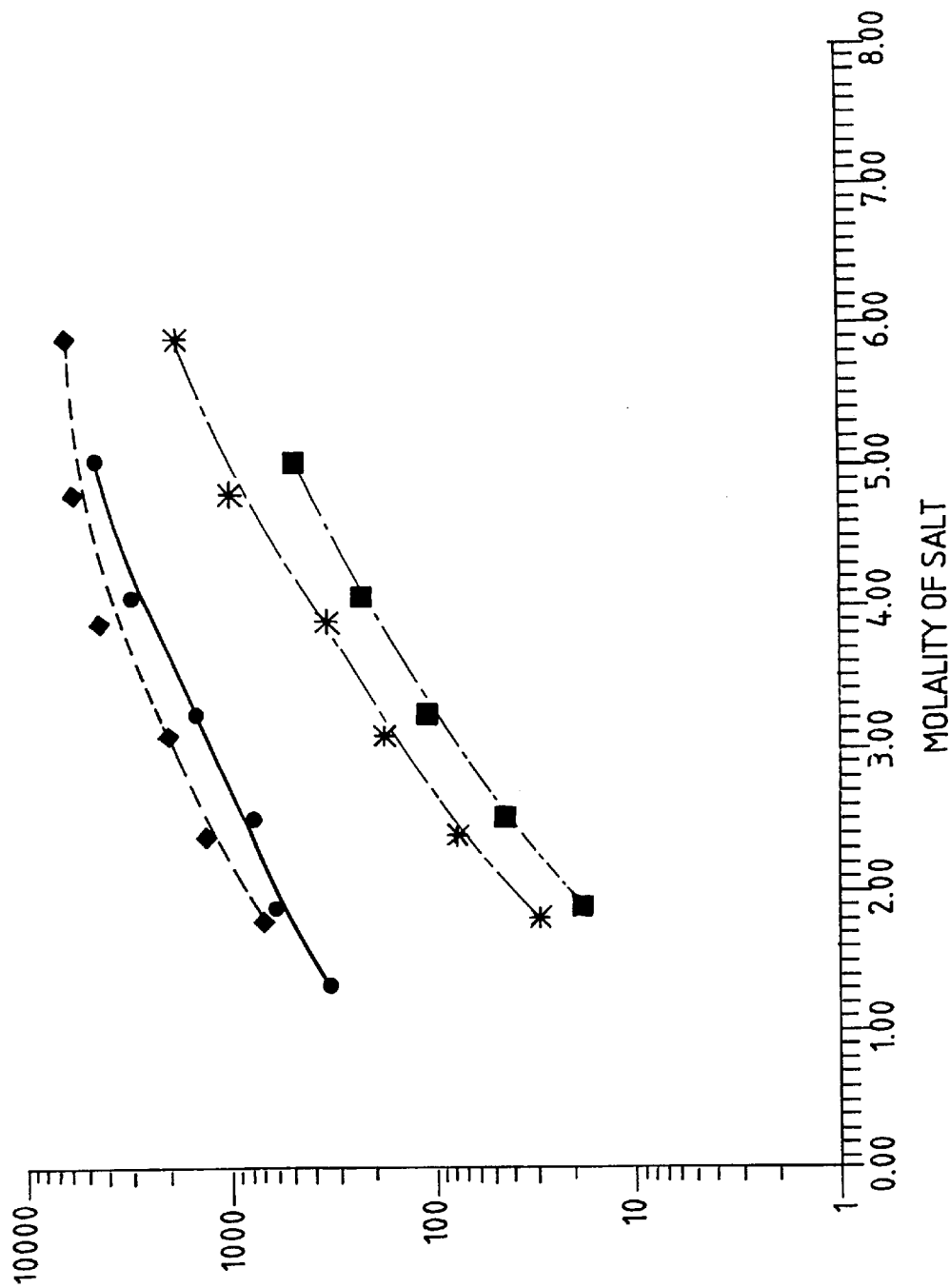
FIG. 9 is a graph of D or D$_w$ values at 25° C. for TcO$_4^{-1}$ ions using 107–2000 particles in K$_2$CO$_3$ (darkened diamonds). and (NH$_4$)$_2$SO$_4$ (darkened circles) and liquid/liquid biphase extraction using PEG-2000 in K$_2$CO$_3$ (stars) and (NH$_4$)$_2$SO$_4$ (darkened squares) plotted versus salt molality.
Figure 10:
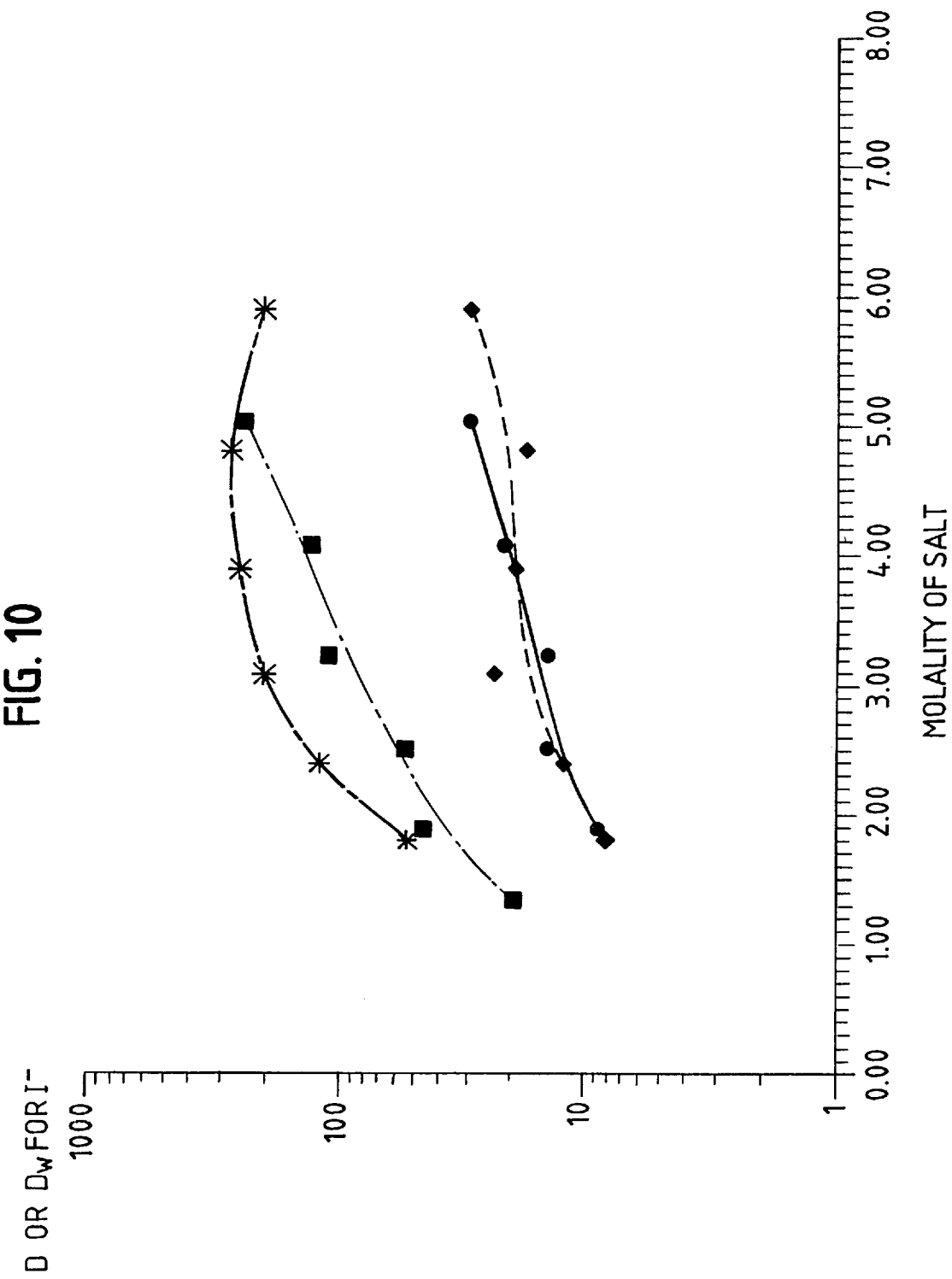
FIG. 10 is a graph of D or D$_w$ values at 25° C. for I$^{-1}$ ions using 107–2000 separation particles in K$_2$CO$_3$ (stars) and (NH$_4$)$_2$SO$_4$ (darkened squares) and liquid/liquid biphase extraction using PEG-2000 in K$_2$CO$_3$ (darkened diamonds) and (NH$_4$)$_2$SO$_4$ (darkened circles) plotted versus molality as described for FIG. 9.

Distribution of pertechnetate and iodide anions in PEG-2000-based liquid/liquid systems and 107–2000 separation particle systems are depicted in FIGS. 9 and 10. Uptake of $TcO_4^{-1}$ and $I^{-1}$ ions by 107–2000 separation particles was about an order of magnitude larger than extraction by the PEG-rich phase of the liquid/liquid system. The reasons for this are not yet clear, but could be related to the preorganization of the polymers induced by their covalent bonding to the support material or to the higher concentration of Me-PEG on the resin due to the elimination of PEG loss due to its solubility in the salt-rich phase.

The performance of 107–2000 separation particles involving separations from real-world waste matrices has been excellent. The separation of the pertechnetate anion from high level defense wastes is currently of great concern [Kupfer, "Preparation of Nonradioactive Substitutes for Radioactive Wastes", Rockwell Hanford Operations (1981); Schulz, et al., "Candidate Reagents and Procedures for the Dissolution of Hanford Site Single-Shell Tank Sludges:, Westinghouse Hanford Co., 1991; Kupfer, "Disposal of Hanford Site Tank Waste", Westinghouse Hanford Co., 1993] due to the long half-life of $^{99}Tc$ ($2.12 \times 10^5$ years) and its environmental mobility as the pertechnetate anion. The compositions of three representative simulated Hanford waste streams, Hanford tank SY-101 (SY-101), neutralized current acid waste (NCAW), and single shell tank waste (SST), showed sufficient concentrations of phase forming anions (namely $OH^-$) to support aqueous biphasic separations. [Rogers et al., *Solvent Extr. Ion Exch.*, (in press 1995)] Preliminary studies of $TcO_4^{-1}$ retention by 107 materials from these three waste stimulants showed that $TcO_4^{-1}$ anions could be efficiently separated from these very complex matrices.

Figure 11:
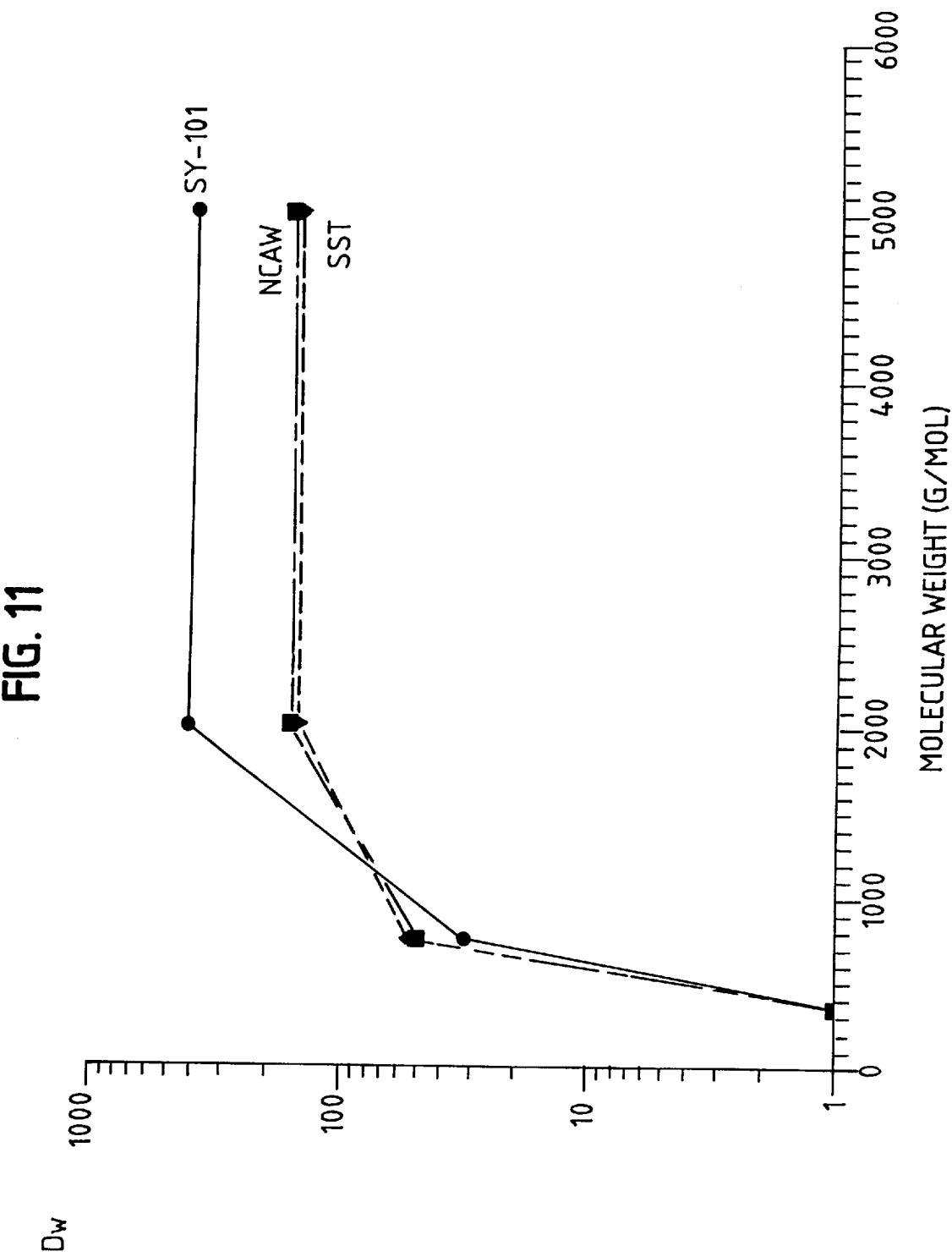
FIG. 11 shows D$_w$ values for TcO$_4^{-1}$ ions at 25° C. versus the molecular weight of poly(ethylene glycol) methyl ether used to prepare 107–350, –750, –2000 and –5000 separation particles from three simulated Hanford Tank Wastes: SY-101 (darkened circles) NCAW (darkened squares) and SST (darkened diamonds).

FIG. 11 shows the performance of the four different 107 materials in three different simulated Hanford tank wastes. Pertechnetate extraction by the lightest PEG 107 material (107–350) was poor, whereas 107–750 separation particles reached a maximum $D_w$ of 54 in the SST waste stimulant. Separation particles 107–2000 performed slightly better than 107–5000, although the weight distribution ratios are very similar. The highest $D_w$ of 410 was obtained for 107–2000 separation particles in the SY-101 stimulant and illustrates the use of these materials in real-world separations. An important point here is that no pH adjustment of these highly basic waste simulants was carried out. Few extraction schemes exist for carrying out separations in such alkaline conditions and this is an important achievement of the 107 material approach.

The low weight distribution ratios obtained for pertechnetate and iodide from water with 107–2000 indicate a solution to the stripping difficulties plaguing the liquid/liquid method. Without a sufficiently high concentration of aqueous liquid/liquid biphase-forming anions, no retention of pertechnetate or iodide was observed. In a column mode, the $TcO_4^{-1}$ and $I^{-1}$ can be extracted from mobile phases of aqueous liquid/liquid biphase-forming anions, bound to the solid support of separation particles, and then stripped using water or an aqueous solution that does not contain a poly (ethylene glycol) liquid/liquid biphase-forming amount of salt.

The solid-supported aqueous biphasic-type separations have been shown to be an effective alternative to the liquid/liquid approach. Many of the disadvantages of the latter have been addressed, namely that loss of the phase-forming polymer to the salt-rich phase has been eliminated by tethering the polymer to an inert support, and perhaps most importantly is the ability to strip partitioned solutes using water or an aqueous solution of a salt that does not form an aqueous liquid/liquid biphase with PEG. Several advantages have also come forth including the observation that less salt is required to effect a separation, and that separations at a given concentration of salt (and comparable molecular weight polyethers) can be an order of magnitude or more higher on the 107 material than in a liquid/liquid biphase separation. In addition, the covalent linkage to the cross-linked polystyrene particle affords good chemical stability over a wide pH value range.

Materials and Methods

Tetraethylene glycol, Me-PEG-350, Me-PEG-750, PEG-2000; Me-PEG-2000, Me-PEG-5000 and chloromethylated polystyrene-1-percent-divinylbenzene beads (Merrifield's peptide resin; 200–400 mesh) were obtained from Aldrich. All were used without further purification. Reagent-grade $(NH_4)_2SO_4$, $K_2CO_3$, $K_3PO_4$, and NaOH were used as received. The reagents and procedures for preparing the Hanford simulated waste solutions have been reported. [Rogers et al., *Solvent Extr. Ion Exch.*, (in press 1995)] A water solution of $NH_4{}^{99}TcO_4$ was obtained from Isotope Products Laboratories. $^{203}Hg$ as $HgCl_2$ in HCl with a specific activity of more than about 0.3 mCi/mg was obtained from Amersham. $^{109}Cd$ as $CdCl_2$ in HCl having a specific activity of about 1–5 Ci/g and $^{129}I$ as NaI in $Na_2SO_3$ solution having a specific activity of about 0.17 mCi/mg were purchased from New England Nuclear. Tetrahydrofuran (THF) was of reagent quality, was distilled from the sodium benzophenone ketyl radical, and was transferred and stored under argon prior to use. All water was deionized using commercial deionization systems.

Metal Ion Uptake Studies

All separation particles were stored in tightly capped containers and were not exposed to air for any extensive period of time so as to avoid a change in water content. All weight distribution ratios were radiometrically determined by batch contacts of the resin with the desired analyte-containing solution. The dry weight distribution ratio is defined as:

$$D_W = \left( \frac{A_o - A_f}{A_f} \right) \left( \frac{V}{m_R \cdot wcf} \right)$$

where $A_o$=the activity of the solution prior to contact with the resin, $A_f$=the activity of the solution after contact with resin, V=volume (mL) of solution contacted with resin, $m_R$=mass (g) of resin, and wcf=the dry weight conversion factor relating the mass of the hydrated resin to its dry weight.

The $D_W$ studies were carried out in the following manner. The radiotracer was added to 1.2 mL of the solution of interest, gently mixed, and a 100 μL aliquot was removed for radiometric counting to determine the initial activity of the solution ($A_o$). One mL of the remaining solution (V) was added to a known mass of hydrated resin ($m_R$) and centrifuged for one minute. The solution was then stirred gently (so that the resin was just suspended in the solution) for 30 minutes, followed by one minute of centrifugation, and another 30 minutes of stirring. After one additional minute of centrifugation, the solution was pipeted away from the resin and filtered through a 45 μm pipet-tip filter so that any suspended resin would be removed. A 100 μL aliquot was then removed for counting the final activity of the solution ($A_f$).

Synthesis of Chromatographic Materials

Williamson Ether Syntheses of 107 Materials

The syntheses of 107–350 particles and 107–750, 107–2000, and 107–5000 separation particles were all carried out in a similar manner and any unique aspects of the individual syntheses will be noted.

Thus, under an Ar atmosphere NaH (0.38 g, 16 mmol) was passed into a 1 L 3-neck flask that was capped and brought out to the bench top. Under a positive flow of Ar the system was equipped with a 400 mL slow addition funnel and a water jacketed reflux condenser. THF (≈400 mL) was then transferred to the addition funnel via standard cannula techniques. A portion of the THF (100 mL) was drained into the round-bottom flask in order to suspend the NaH with stirring.

Either Me-PEG-350 (959 μL, 3.0 mmol), Me-PEG-750 (2.25 g, 3.0 mmol), or Me-PEG-5000 (15.0 g, 3.0 mmol) was then added to the addition funnel under a positive Ar flow. The same procedure was utilized in the preparation of 107–2000 separation particles, except that a 3:1 molar excess of Me-PEG-2000 alkoxide to resin active sites was prepared with NaH (1.07 g, 45 mmol) and Me-PEG-2000 (18.0 g, 9.0 mmol). The Me-PEG-750, Me-PEG-2000, and Me-PEG-5000 are solids that were melted into the THF in the addition funnel with the aid of a hot air gun. This solution was then added dropwise over approximately one-half to one hour to the NaH suspension at zero degrees C. Once the addition was complete, the solution was stirred at zero degrees C. for one hour.

The mixture was then warmed to room temperature with stirring, followed by the addition of chloromethylated polystyrene-1-percent-divinylbenzene (3.0 g, 3.0 mmol reactive sites) under a positive Ar flow. The reaction was stirred at 25° C. for one to two hours followed by 36 to 72 hours of refluxing with stirring. The resulting murky solutions were then filtered using a large Büchner funnel, and the resulting solids were exhaustively extracted with THF in a Soxhlet extraction apparatus for 72 hours to remove unbound Me-PEG. The extracted resins were then dried in vacuo and small aliquots were hydrated for the weight distribution ratio studies as needed. Combustion analyses of the precursor chloromethylated polystyrene- 1-percent-divinylbenzene and the dry 107 materials showed a decrease in carbon percentage consistent with the grafting of Me-PEG moieties. Because the Me-PEG molecular weights are average values and the functionalization of the resin is reported as an approximate value, no compositional information other than the observed decrease in carbon percentages can be obtained. Analysis found for chloromethylated polystyrene-1-percent-divinylbenzene: (percent) C, 88.44; H, 7.35. Found for 107–350: C, 66.65; H, 6.64. Found for 107–750: C, 68.68; H, 7.75. Found for 107–2000: C, 67.06; H, 8.62. Found for 107–5000: C, 67.78; H, 8.16.

Procedure for the $^{99m}TcO_4{}^{-1}/^{99}MoO_4{}^{-2}$ Separation Using 107–5000 as Solid Support A disposable plastic column equipped with a Luer-lock stopcock and porous plastic bed support was slurry packed with 107–5000 separation particles in water and back-washed. A porous plastic frit was placed on top of the bed to prevent its disruption during the addition of eluent. The bed volume was 1.63 mL and the free column volume (fcv) was determined by $^{99}MoO_4{}^{-2}$ breakthrough. The fcv of 0.392 mL was comparable to that obtained using a sodium breakthrough/flame test. All eluate volumes were calculated gravimetrically using the respective solution densities.

The 107–5000 separation particle-containing column was equilibrated with 5.00 mL (12.8 fcv) of 5.0M NaOH. Thereafter, 11.2 mL (28.6 fcv) of $Na_2{}^{99}MoO_4$ in 5.0M NaOH was eluted on the column using gravity flow (<0.3 mL/minute). Prior to rinsing, the reservoir was washed three times with 3 mL of $K_2CO_3$ to remove residual $Na_2{}^{99}MoO_4$. The column was rinsed of $Na_2{}^{99}MoO_4$ by elution with 4.3 mL (11.0 fcv) of 3.0M $K_2CO_3$.

Water [13.3 mL (33.0 fcv)] was passed into the column and over the resin to remove the $Na^{99m}TcO_4$. Activity was observed in the eluate after several fcv indicating that $^{99m}TcO_4{}^{-1}$ anion was being removed. The water strip was accompanied by a 30 percent swelling of the resin.

The total γ activity of $^{99}MoO_4{}^{-2}$ ions eluted on the column was $5.19 \times 10^6$ cpm. The sum of the activity of $^{99m}TcO_4{}^{-1}$ anions stripped from the column was $1.97 \times 10^7$ cpm. (The $^{99m}Tc$ activity is higher than the $^{99}Mo$ due to the higher conversion to γ for the $^{99m}Tc$ nuclide.) From 49–54 fcv, $1.79\times10^7$ cpm of $^{99m}TcO_4^{-1}$ were collected, which corresponds to 91 percent of the $^{99m}Tc$ activity being recovered in five fcv (1.96 mL).

Figure 12:
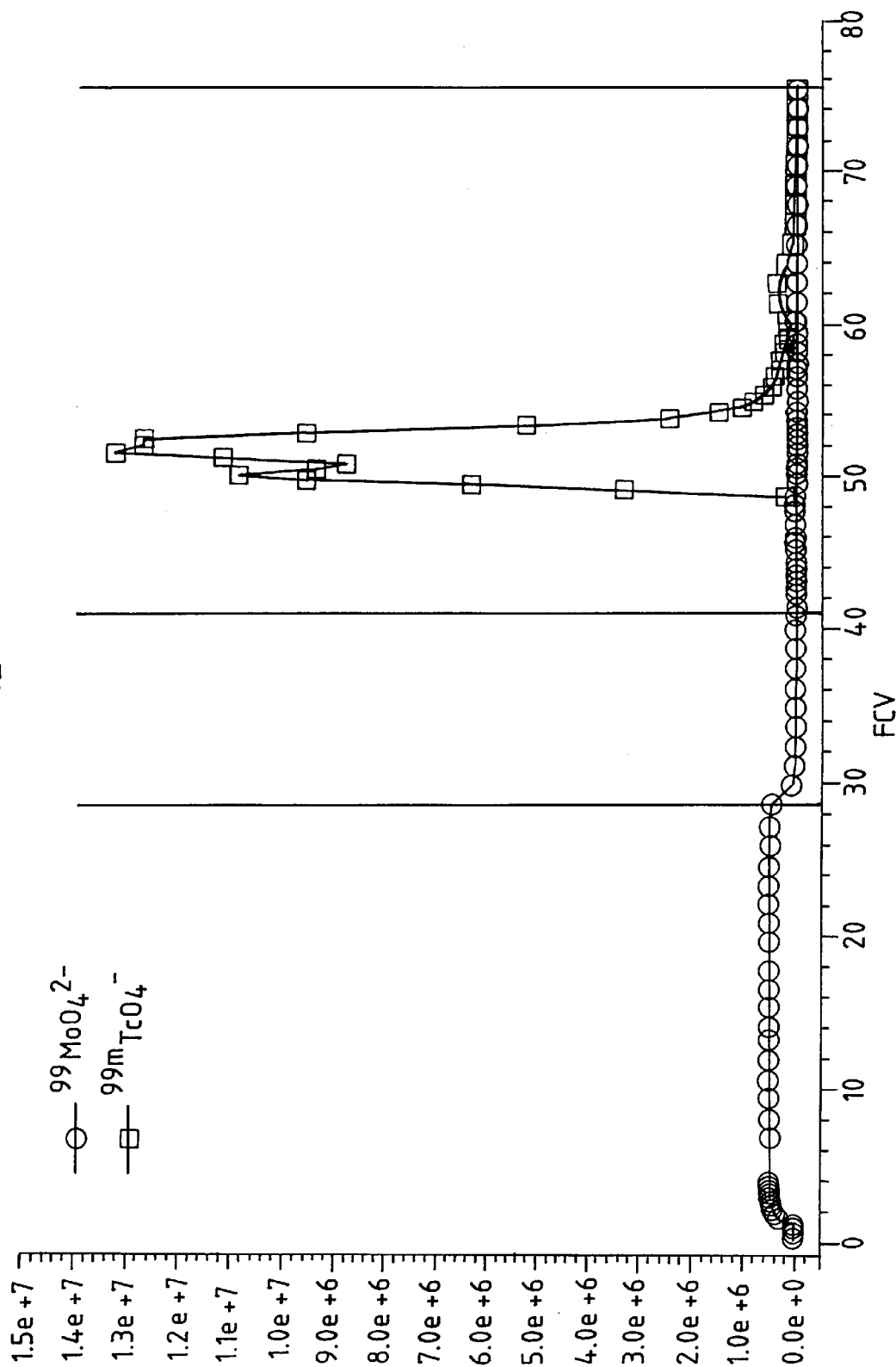
FIG. 12 shows the results of a separation and recovery process described herein using 107–5000 separation particles at 22° C. Counts per minute per milliliter (cpm/mL) with the exponent shown are plotted on the ordinate for $^{99}$MoO$_4^{-2}$(open circles) and $^{99m}$TcO$_4^{-1}$ (open squares). Free column volumes (fcv) of eluate are plotted on the abscissa. The column was loaded for about 29 fcv with 5M NaOH, thereafter washed with 3M K$_2$CO$_3$ for about 13 fcv and then stripped using water for about another 34.5 fcv. The column had a fcv of 0.392 mL.

An exemplary plot of the elution of $^{99}MoO_4^{-2}$ and $^{99m}TcO_4^{-1}$ anions from this column is shown in FIG. 12. Smaller samples of eluate were taken at the beginning and end of peaks on the chromatogram, whereas larger cuts were sampled during plateaus. As a result, the ordinate of the chromatogram has units of cpm/mL so that all activities are on a uniform scale.

Figure 13:
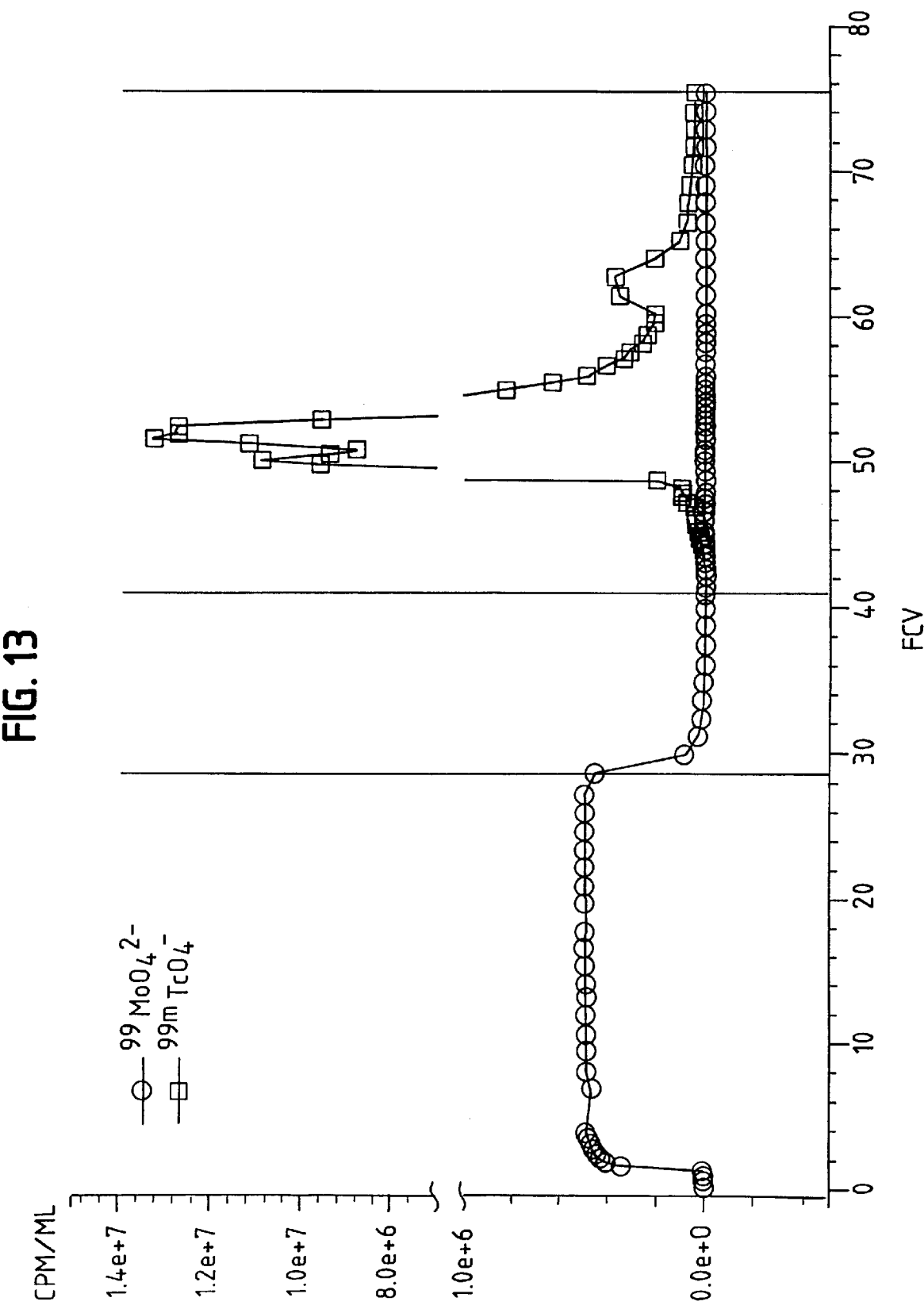
FIG. 13 is another graph of the process whose results are shown in FIG. 12 but using a broken axis as the ordinate.

FIG. 13 shows the same elution curves on a broken axis scale. Following breakthrough, the $^{99}MoO_4^{-2}$ anions eluted steadily forming a plateau during the load phase. The $K_2CO_3$ rinse showed a steady drop in $^{99}MoO_4^{-2}$ anion activity and reached background after seven fcv. The water strip showed $^{99m}TcO_4^{-1}$ anions coming off after eight fcv, and this peak showed some tailing and split peaks that are as yet unexplained.

Insoluble Copolymer Beads Preparation A

Insoluble, cross-linked copolymer beads (100 g) were prepared by suspension polymerization of 67.47 weight percent vinylbenzyl chloride, 23.03 weight percent styrene, 5.0 weight percent divinylbenzene, and 0.5 weight percent benzoyl peroxide; ethylstyrenes were also present from the technical grade divinylbenzene. To introduce porosity, an equal amount of 1:1 (w/w) mixture of toluene and dodecane was added. The entire polymerization mixture was placed in a cylindrical reactor equipped with overhead stirrer, reflux condenser and thermometer, and was heated at 60° C. for one hour, 70° C. for one hour, 85° C. for two hours and finally at 95° C. for seven hours. Stirring speed was set to 280 rpm.

After polymerization was completed, the resulting cross-linked copolymer beads were separated on sieves, washed with hot water, water and acetone, then preswollen in toluene and extracted with this solvent for eight hours using Soxhlet apparatus, and then dried. A subsequent nucleophilic reaction using a carbonation as nucleophile indicated that about 1.23 mmol of replaceable chloride per gram dry weight was present in the beads.

Preparation B

Insoluble, cross-linked copolymer beads (70.7 g) were obtained by suspension polymerization of 90.5 weight percent vinylbenzyl chloride, 2.0 weight percent divinylbenzene, and 0.5 weight percent benzoyl peroxide (with the ethylstyrenes present in the technical grade divinylbenzene). A nucleophilic reaction with a carbanion nucleophile indicated the presence of about 1.62 mmol of replaceable chloride per gram dry weight of this resin.

Preparation C

Insoluble, cross-linked copolymer beads (100 g) were obtained by suspension polymerization of 2.0 weight percent of 2-ethyl-(2-hydroxymethyl)-1,3-propanediol trimethacrylate, 97 weight percent of glycidyl methacrylate and 1.0 weight percent of benzoyl peroxide. About 1.3 mmol per gram dry weight of ring-openable epoxide groups were found upon nucleophilic reaction with a carbanion.

Dry Weight Conversion Factor

Weight conversion factors that are a measure of the wettability of separation particles and figure in $D_w$ calculations are determined as follows.

A sample of separation particles is hydrated in an excess of water for 30 minutes at room temperature, and then filtered on a Büchner funnel and dried in place with a stream of water-saturated air for 5 minutes at a pressure of about 660–670 torr. A portion of that air-dried material is removed, weighed and then dried in an oven at 110° C. until a constant mass was obtained. The dry mass of the separation particles divided by the mass of air-dried separation particles provided the dry weight conversion factor. Each gravimetric analysis was performed in duplicate, and was repeated each time a new batch of hydrated separation particles was prepared.

Separation Particle Loading Study

Figure 14:
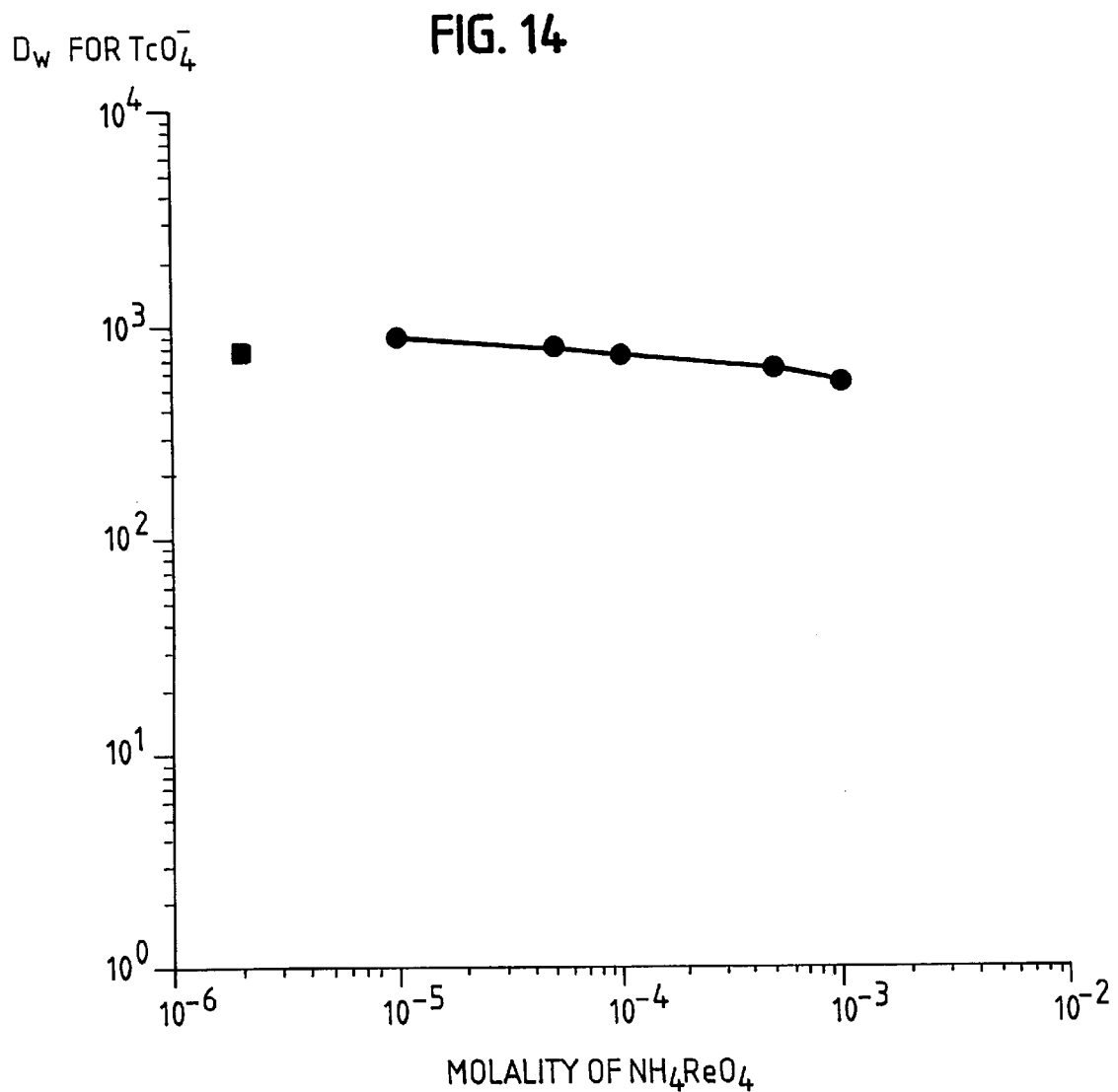
FIG. 14 is a graph showing $D_w$ values for $TcO_4^{-1}$ ions in 2.0M (2.3 m) $(NH_4)_2SO_4$ at 25° C. using 107–5000 separation particles in the absence (darkened square) and presence of various molal concentrations of $NH_4ReO_4$ (darkened circles).

Distribution values for $NH_4TCO_4$ were determined using 107–5000 separation particles in 2.00M (2.31 m) $(NH_4)_2SO_4$ solution at 25° C. in the absence and presence of $NH_4ReO_4$ at $10^{-5}$, $5\times10^{-5}$, $10^{-4}$, $5\times10^{-4}$ and $10^{-3}$ molar concentrations. The data from these studies are shown in FIG. 14. As is seen, there was little decrease in the observed $D_w$ values, even at $10^{-3}M$ $NH_4ReO_4$. This lack of decrease indicates that the $TcO_4^{-1}$ ions were not displaced by the $ReO_4^{-1}$ ions, and that the capacity of the separation particles is at least $10^{-3}$ molar $TcO_4^{-1}$ per gram of particles.

Weight Distribution and Percent $CH_2O/mm^2$ Surface Area $D_w$ values were determined for $TcO_4^{-1}$ ions in 5.92 m $K_2CO_3$ solution using 107–350, –750, –2000, –5000 and –5750 separation particles prepared from 200–400 mesh Merrifield's peptide resin (polystyrene-1 percent-divinylbenzene) precursor particles. The unreacted particles were also assayed.

Figure 15:
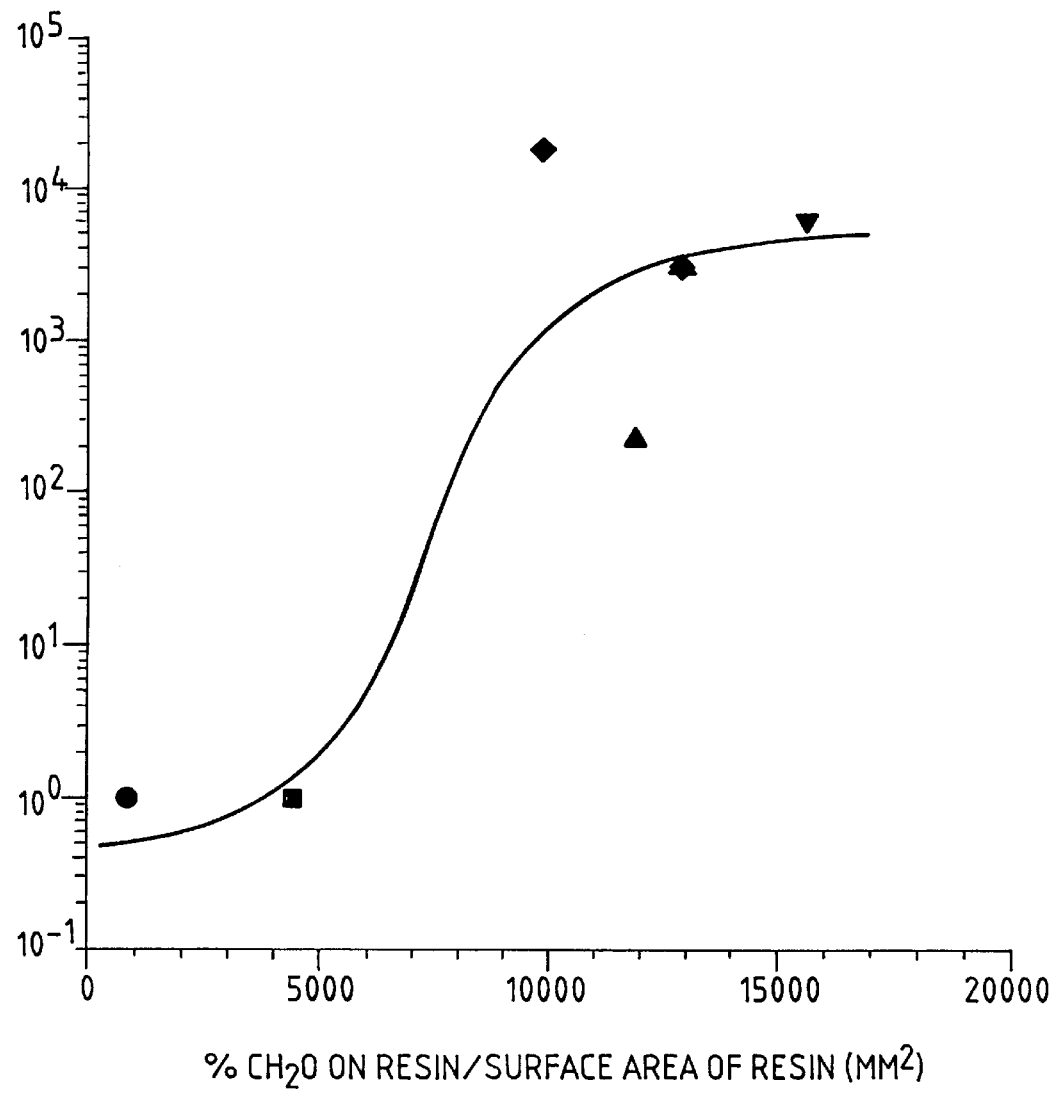
FIG. 15 is a graph showing $D_w$ values for $TcO_4^{-1}$ ions in 5.9 m $K_2CO_3$ at 25° C. versus percent $CH_2O/mm^2$ of particle surface for various particles. Those particles were: Merrifield's peptide resin used herein (darkened circle); 107–350 (darkened square); 107–750 separation particles (darkened triangle); 107–2000 separation particles (darkened inverted triangle); 107–5000 separation particles (darkened diamond) and 107–5750 separation particles (darkened hexagon).

The results are shown in FIG. 15 plotted against the percent $CH_2O/mm^2$ particle surface area. As is seen from the data, $D_w$ values of about 100 or more that indicate useful materials occur at $CH_2O/mm^2$ values greater than about 8000.

Radiolysis Stability Studies

Radiolysis studies were carried out to determine the stability of an illustrative batch of 107 separation particles to high doses of ionizing radiation. Approximately 500 mg samples of 107–5000 separation particles in about 2 mL of water or 5M NaOH were put into glass culture tubes. The tubes were placed into the 70,000 Ci $^{60}Co$ γ-irradiation facility at Argonne National Laboratory and were subjected to doses ranging from 1.2 Mrads/2 hours to 24 Mrads/40 hours. The irradiated samples were washed with water, air dried and then weight distribution values ($D_w$) for $TcO_4^{-1}$ anions were determined at 25° C. to assay possible performance degradation as a function of increasing radiation dose.

Up to 24 Mrads, $D_w$ values showed no significant degradation of performance relative to an unirradiated sample of the same batch of separation particles through 4 m $K_2CO_3$. Above that salt concentration, a decrease in $D_w$ values was noted and not yet explained. However, the retention properties of the separation particles remained very high. The solvent variation from water to 5M NaOH during irradiation did not appear to alter the separation particles or adversely affect their uptake properties.

Figure 16:
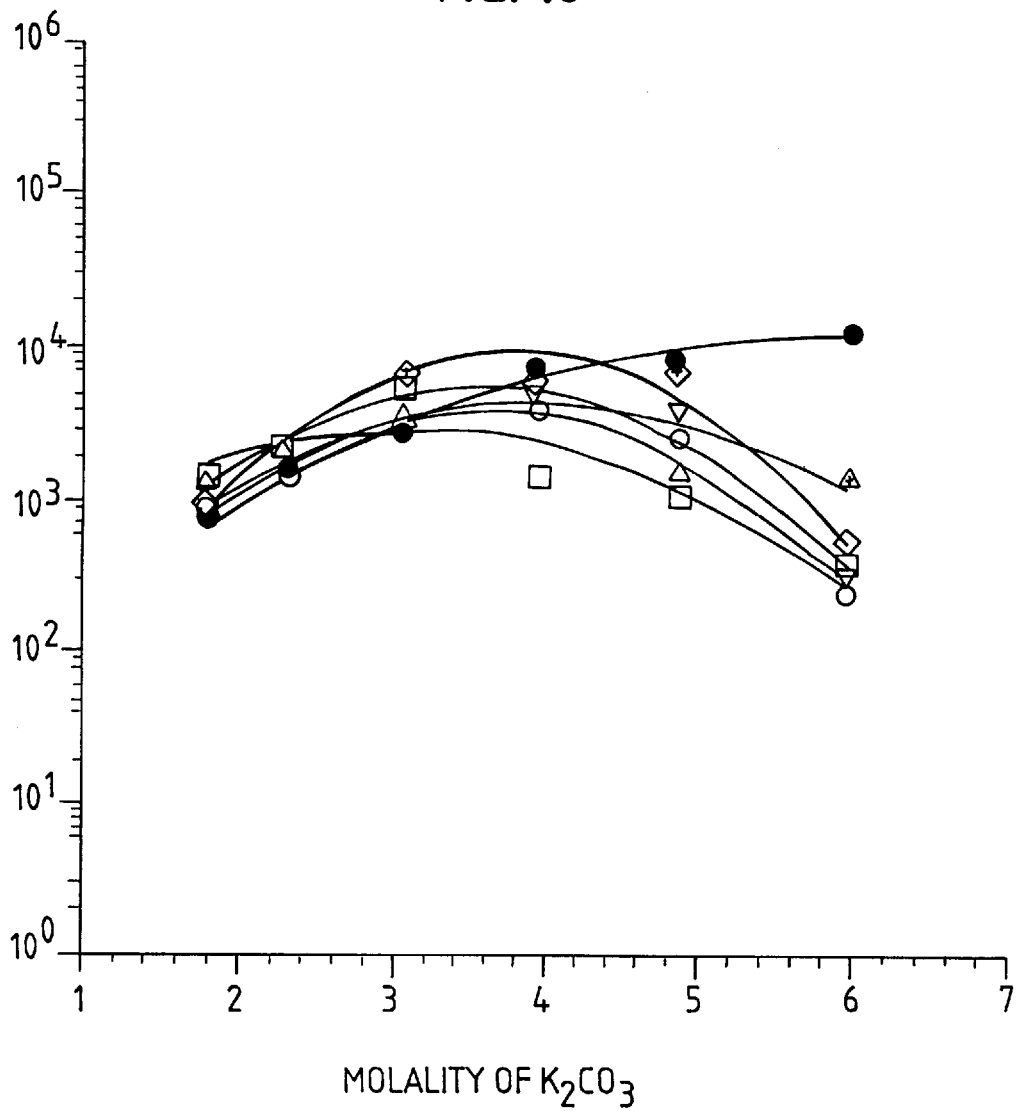
FIG. 16 is a graph showing $D_w$ values for $TcO_4^{-1}$ ions at 25° C. using 107–5000 separation particles that had been irradiated with 1.2 Mrads in water (open boxes) or 5M NaOH (inverted triangles), irradiated with 12 Mrads in water (open hexagons) and irradiated with 24 Mrads in water (triangle plus cross) or 5M NaOH (diamond plus cross) compared to unirradiated particles (darkened circles) as a function of $K_2CO_3$ concentration. Data are shown as in FIG. 5.

The radiation doses used in these studies exceeded those anticipated in radiopharmaceutical waste separation applications and other presently contemplated uses by at least a factor of ten. The chemical and radiolytic stability and durability of the assayed separation particles is evidenced by $D_w$ values for $TcO_4^{-1}$ anions in the range of about $10^3$ to about $10^4$ obtained after receiving a dose of 24 Mrads in an aqueous solution. Exemplary data for unirradiated separation particles and separation particles irradiated with 1.2 Mrads and 24 Mrads in water and 5M NaOH as well as separate particles irradiated with 12 Mrads in water are shown in FIG. 16.

Separation and Recovery of $^{129}IO_3^{-1}$ Anions

A disposable plastic column equipped with a Luer-lock stopcock and porous plastic bed support was slurry-packed with 107–5000 separation particles in water. A porous plastic frit was placed on top of the bed to prevent its disruption during the addition of eluent. The free column volume (fcv) was determined to be 0.198 mL by monitoring the breakthrough of $^{22}Na^{+1}$ ions. All eluate volumes were calculated gravimetrically using the respective solution densities.

The $^{129}IO_3^{-1}$ anion tracer was prepared by oxidation of the iodide to iodine using $MnO_2$ in 2M $H_2SO_4$. The iodine was then extracted from the aqueous solution using 3×200 μL extractions with $CCl_4$, which resulted in a purple organic phase. The $CCl_4$ was then evaporated through an activated carbon filter using mild heat. The $I_2$ residue was combined with about 200 μL of a 0.1M solution of $NaClO_3$, which was accompanied by liberation of $Cl_2$ gas and the disappearance of the brown color of the $I_2$ solution, to form the $IO_3^{-1}$ anion solution.

The packed column was equilibrated with 4.81 mL (24.3 fcv) of 3.5M $K_2CO_3$, and 5.2 mL (26.3 fcv) of $Na^{129}IO_3$ in 3.5M $K_2CO_3$ were eluted onto the column using gravity flow (<0.4 mL/minute) to bind the $IO_3^{-1}$ anions to the separation particles. Prior to washing the separation particles, the column reservoir was washed three times with 3 mL of 3.5M $K_2CO_3$ to remove residual $Na^{129}IO_3$ from the reservoir. The column was washed by elution with 4.75 mL (24.0 fcv) of 3.5M $K_2CO_3$.

Figure 17:
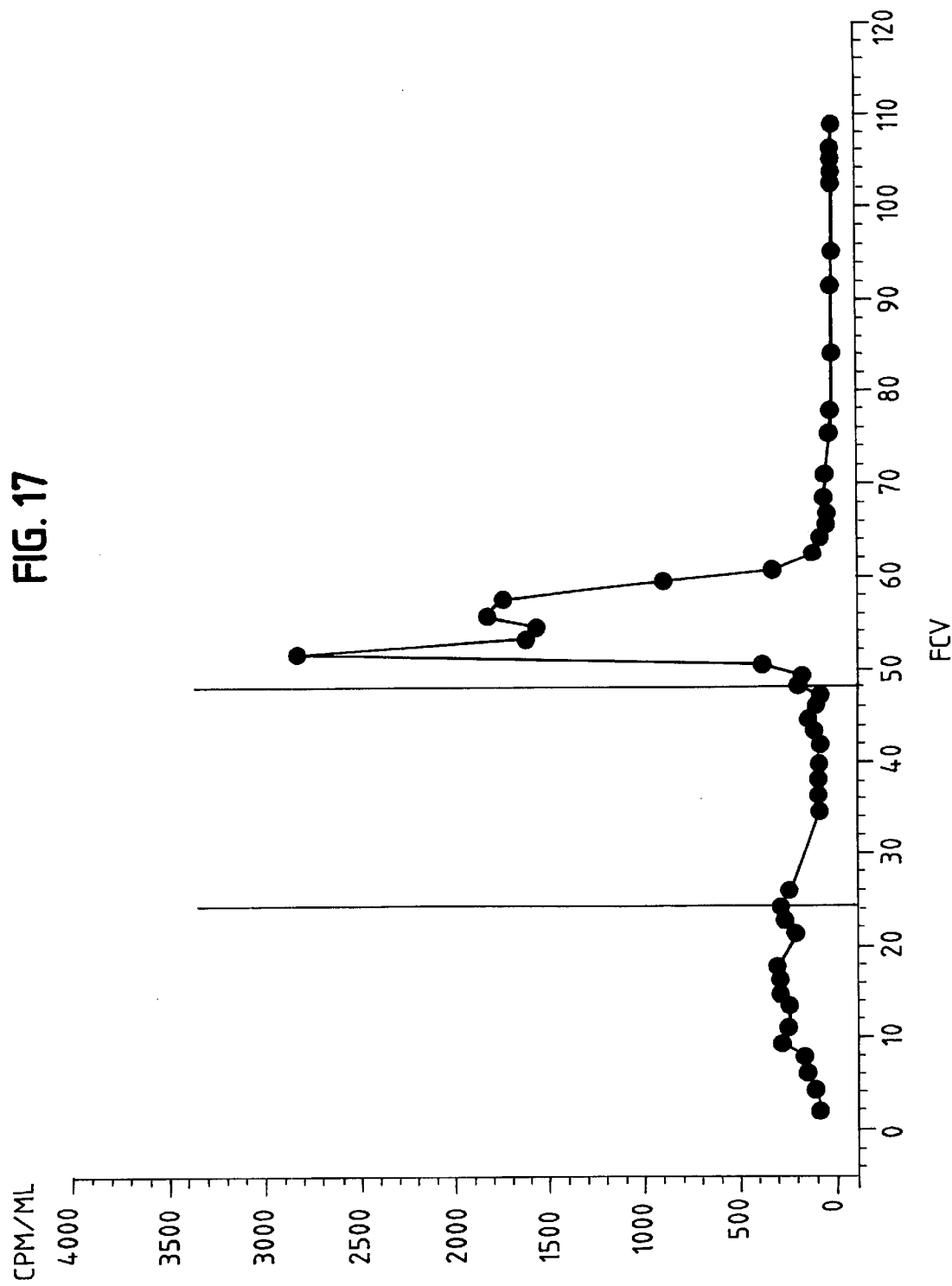
FIG. 17 shows the results of a separation and recovery process described herein using 107–5000 separation particles at 25° C. Counts per minute per milliliter (cpm/mL) are plotted on the ordinate for $^{129}IO_3^{-1}$. Free column volumes (fcv) of eluate are plotted on the abscissa. The column was loaded for about 24 fcv with 3.5M $K_2CO_3$, thereafter washed with 3.5M $K_2CO_3$ for about 24 fcv, and then stripped using water for about another 62 fcv. The column had a fcv of 0.198 mL.

Water (12.3 mL; 62.1 fcv) was thereafter passed over the resin to strip (free) the $^{129}IO_3^{-1}$ ions from the separation particles. Activity was observed in the eluate after 2.2 fcv, indicating that the $^{129}IO_3^{-1}$ was being removed. The water strip was accompanied by a 30 percent swelling of the resin. The elution pattern evidenced by eluted 129I decay is shown in FIG. 17.

The total β activity of $^{129}IO_3^{-1}$ eluted from the column was 5.19×10³ cpm. From 52–60 fcv, 3.11×10³ cpm of $^{129}IO_3^{-1}$ were collected, which corresponds to 60 percent of the $^{129}IO_3^{-1}$ activity in eight fcv (1.58 mL).

The chromatogram shows a broad peak from 10–30 fcv that could be due to channeling or poor counting statistics. Due to the low specific activity of the $^{129}IO_3^{-1}$ anions and the low yield of the synthesis, the activity in these samples was extremely low. A channeling problem would explain the peak in the load, as well as the peculiar features of the iodide chromatogram (the increasing activity observed in the rinse phase) because the same column was used for both experiments. The channeling could be an artifact of the shrink/swell cycles the columns go through upon changing from load/rinse to strip.

Separation and Recovery of $^{129}I^{-1}$ Anions

A disposable plastic column equipped with a Luer-lock stopcock and porous plastic bed support was slurry packed with 107–5000 separation particles in water. A porous plastic frit was placed on top of the bed to prevent its disruption during the addition of eluent. The free column volume (fcv) was determined to be 0.198 mL by monitoring the breakthrough of $^{22}Na^{+1}$. All eluate volumes were calculated gravimetrically using the respective solution densities.

The packed column was equilibrated with 5.00 mL (25.3 fcv) of 3.5M $K_2CO_3$, and 10.0 mL (50.5 fcv) of $Na^{129}I$ in 3.5M $K_2CO_3$ was eluted onto the column using gravity flow (<0.4 mL/minute). Prior to rinsing the separation particle bed, the column reservoir was washed three times with 3 mL of 3.5M $K_2CO_3$ to remove residual $Na^{129}I$ from the reservoir. The column was rinsed by elution with 4.36 mL (22.0 fcv) of 3.5M $K_2CO_3$.

Figure 18:
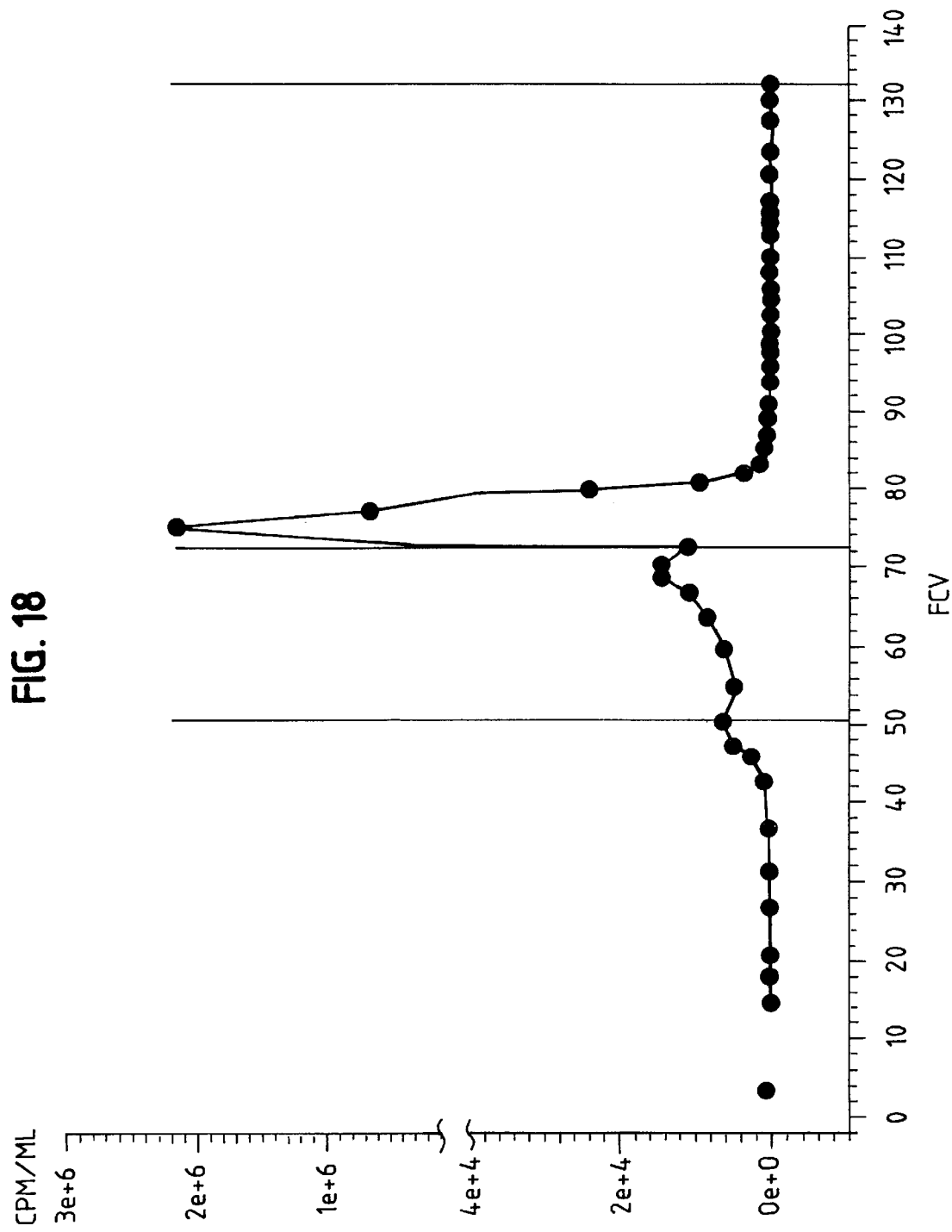
FIG. 18 shows the results of a separation and recovery process described herein using 107–5000 separation particles at 25° C. Counts per minute per milliliter (cpm/mL) with the exponent shown are plotted on the ordinate for $^{129}I^{-1}$. Free column volumes (fcv) of eluate are plotted on the abscissa. The column was loaded for about 50 fcv with 3.5M $K_2CO_3$, thereafter washed with 3.5M $K_2CO_3$ for about 22 fcv, and then stripped using water for about another 62 fcv. The column had a fcv of 0.198 mL.

Water (12.3 mL; 62.1 fcv) was passed over the resin to free the $^{129}I^{-1}$ anions from the separation particles. Activity was observed in the eluate almost immediately, indicating that the $^{129}I^{-1}$ anion was being removed. The water strip was accompanied by a 30 percent swelling of the resin. The elution pattern evidenced by eluted $^{129}I$ decay is shown in FIG. 18.

The total β activity of $^{129}I^{-1}$ anions eluted from the column was 1.42×10⁶ cpm. From 75–80 fcv, 1.36×10⁶ cpm of $^{129}I^{-1}$ anion were collected, which corresponds to 96 percent of the $^{129}I^{-1}$ anion activity in five fcv (0.99 mL).

The $^{129}I^{-1}$ anion radionuclide has very low specific activity of 0.17 μCi/mg I, which corresponds to a high concentration of stable iodide in the load solution. Radioiodide breakthrough was observed after 8.44 mL (42.6 fcv) of load solution, indicating that in the absence of channeling, the column capacity for iodide had been exceeded. Using the initial count rate of the load solution and the percent column parameters, on estimate of the capacity of the 107–5000 separation materials for iodide is 0.05 mmol iodide per gram of dry resin. Concerns about channeling within the column exist. The shrink/swell cycles that take place upon going from salt to water could easily cause channeling. The absence of a drop in eluate activity during the rinse stage could indicate that interstitial and interchannel load solution was eluting, rather than the just the small interstitial volume.

Separation and Recovery of Iodide Anions and of Mercury and Cadmium Complex Anions Four concentrations of $NH_4I$ in $(NH_4)_2SO_4$ stock solution were prepared by diluting a known mass of $NH_4I$ to volume with 40 percent (w/w) $(NH_4)_2SO_4$. Between 10 and 15 mg of 107–5000 separation particles were weighed into a culture tube and a magnetic stir bar added. Five salt stock solutions [0.0, 0.01, 0.05, 0.1, and 0.5M $NH_4I$ in 40 percent $(NH_4)_2SO_4$; 1.2 mL each] were placed in small shell vials and spiked with 4 μL (tracer quantities) of $^{109}Cd$. After gentle mixing, 100 μL of each solution were removed for counting the initial activity ($A_o$).

One milliliter of each solution prepared above was then added to one of the culture tubes containing the separation particles. The tubes were centrifuged for 2 minutes, stirred gently for 30 minutes, centrifuged for 2 minutes, stirred gently for 30 minutes, and finally centrifuged for an additional 2 minutes. The solutions were transferred from the culture tubes to a clean shell vial, filtered, and placed into a second clean shell vial. An aliquot of these solutions (100 μL) was removed for counting the final activity ($A_f$). The dry weight conversion factor (wcf) was determined gravimetrically to be 0.1546.

The dry weight distribution ratio, Dw, was calculated as discussed before.

The batch uptake measurements of mercury were carried out in a similar manner, but using $^{203}Hg$ tracer in place of $^{109}Cd$ tracer. The dry weight distribution ratios for $Cd^{+2}$ and $Hg^{+2}$ for the various $NH_4I$ concentrations are shown in FIG. 19.

Macro-Scale Studies

To study the effects of macro-scale quantities of the ions investigated, dry weight distribution ratios were obtained for $I^{-1}$, $Cd^{+2}$, and $Hg^{+2}$ with macro-scale amounts (10 to 100 millimolar) of these ions already present. Solutions of 40 percent $(NH_4)_2SO_4$ were prepared that were 0.01M and 0.1M in $HgCl_2$. Similarly, solutions were prepared that were 0.01, 0.1, and 0.5M $NH_4I$ in 40 percent $(NH_4)_2SO_4$. Finally, salt stock solutions were prepared that were 0.01, 0.1, 0.5, and 1M $CdI_2$ in 40 percent $(NH_4)_2SO_4$. The $HgCl_2$ solutions were used to test the uptake of mercury by spiking these solutions with tracer scale $^{203}Hg$. The $NH_4I$ solutions were spiked with tracer $^{129}I$ to measure iodide uptake, and the $CdI_2$ solutions were spiked with $^{109}Cd$. The weight distribution values were obtained in an analogous manner to those described above. The results obtained are summarized in Table 2.

TABLE 2

Dry Weight Distribution Ratios
At Various Ion Concentrations

| [HgCl$_2$] | D$_w$ | [NH$_4$I] | D$_w$ | [CdI$_2$] | D$_w$ |
|---|---|---|---|---|---|
| 0.0* | 22.4 | 0.0* | 468 | 0.0* | 0 |
| 0.01 | 970 | 0.01 | 137 | 0.01 | 198 |
| 0.1 | 21.1 | 0.1 | 29.8 | 0.1 | 32.1 |
|  |  | 0.5 | 22.3 | 0.5 | 0.0 |
|  |  |  |  | 1.0 | 0.0 |

*Values from tracer levels of chaotrope.

The above data further indicate the mechanism of action and also reflect the capacity of the separation particles for the ions studied. In the absence of macro amounts of HgCl$_2$ or CdI$_2$ these ions are not retained on the separation particles. Thus, when the tracer Hg$^{+2}$ or Cd$^{+2}$ in nitrate solution are spiked into the aqueous solution there are no complexing halide ions present and these tracers remain primarily in the aqueous phase. (D$_w$ values below 40 indicate very little or no retention on the separation particles.)

When 0.01M HgCl$_2$ or CdI$_2$ are added to the aqueous solution and these solutions are spiked with radioactive Hg or Cd tracer, the tracer equilibrates with the cold Hg or Cd. Because macro quantities of chloride or iodide were present in the solution, complex anions where formed of both the radioactive tracer and the cold metal cations, which anions were retained on the separation particles. As the concentration of Hg or Cd increased, there was an increasing amount of chaotropic anion retained on the separation particles until the capacity was reached. Once the capacity of the resin was reached the D$_w$ values fell off, as was observed for Hg and Cd at higher concentrations of cold metal cation-containing anions.

The same observations are valid for the iodide studies. When no macro amount of iodide was present the aqueous solution was spiked with a chaotropic iodide anion tracer that was retained on the separation particles. (D$_I$ at tracer scale only is 468.) As the concentration of cold iodide was increased, the radioactive tracer equilibrated with the cold iodide. As the capacity of the resin was exceeded, the D$_I$ values fell off.

The foregoing description and the examples are intended as illustrative and are not to be taken as limiting. Still other variations within the spirit and scope of this invention are possible and will readily present themselves to those skilled in the art.

We claim:

1. A process for recovering chaotropic anions from an aqueous solution that comprises the steps of:
   (a) contacting separation particles with an aqueous solution containing (i) chaotropic anions and (ii) a poly(ethylene glycol) liquid/liquid biphase-forming amount of a dissolved salt to form a solid/liquid phase admixture, said separation particles comprising particles having a plurality of covalently bonded —X—(CH$_2$CH$_2$O)$_n$—CH$_2$CH$_2$R groups wherein X is O, S, NH or N—(CH$_2$CH$_2$O)$_m$—R$^3$ where m is a number having an average value of zero to about 225, n is a number having an average value of about 15 to about 225, R$^3$ is hydrogen, C$_1$–C$_2$ alkyl, 2-hydroxyethyl or CH$_2$CH$_2$R, and R is selected from the group consisting of —OH, C$_1$–C$_{10}$ hydrocarbyl ether having a molecular weight up to about one-tenth that of the —(CH$_2$CH$_2$O)$_n$— portion, carboxylate, sulfonate, phosphonate and —NR$^1$R$^2$ groups where each of R$^1$ and R$^2$ is independently hydrogen, C$_2$–C$_3$ hydroxyalkyl, C$_1$–C$_6$ alkyl, or —NR$^1$R$^2$ together form a 5- or 6-membered cyclic amine having zero or one oxygen atom or zero or one additional nitrogen atom in the ring, said separation particles having a percent CH$_2$O/mm$^2$ of particle surface area of greater than about 8000 and less than about 1,000,000;
   (b) maintaining said contact for a time period sufficient to form chaotropic anion-bound separation particles and an aqueous solution having a reduced concentration of chaotropic anions;
   (c) separating said chaotropic anion-bound separation particles from the aqueous solution of step (b) in the presence of an aqueous solution of a poly(ethylene glycol) liquid/liquid biphase-forming amount of a salt to form a second solid/liquid phase admixture containing chaotropic anion-bound separation particles;
   (d) contacting said chaotropic anion-bound separation particles of step (c) with second aqueous solution that does not contain a poly(ethylene glycol) liquid/liquid biphase-forming amount of dissolved salt to free the chaotropic anions from the separation particles and form an aqueous solution containing free chaotropic anions; and
   (e) recovering the chaotropic anion-containing aqueous solution.

2. The process according to claim 1 wherein n, has an average value of about 40 to about 130.

3. The process according to claim 1 wherein R is a C$_1$–C$_{10}$ hydrocarbyl ether group.

4. The process according to claim 1 wherein said percent CH$_2$O/mm$^2$ of particle surface area is about 9,000 to about 20,000.

5. The process according to claim 1 wherein said particles are reacted cross-linked poly(styrene-vinyl benzyl halide) particles.

6. The process according to claim 1 wherein each said chaotropic anion is a complex of a metal cation and halide or pseudohalide anions, and each of said aqueous solutions of steps (a), (b) and (c) contains an amount of said halide or pseudohalide anions in an amount sufficient to form said complex.

7. The process according to claim 1 wherein each said chaotropic anion is radioactive.

8. A process for recovering chaotropic anions from an aqueous solution that comprises the steps of:
   (a) contacting separation particles with an aqueous solution containing (i) chaotropic anions and (ii) a poly(ethylene glycol) liquid/liquid biphase-forming amount of a dissolved salt to form a solid/liquid phase admixture, said separation particles comprising reacted cross-linked poly(styrene-vinyl benzyl halide) particles having a plurality of covalently bonded —X—(CH$_2$CH$_2$O)$_n$—CH$_2$CH$_2$R groups wherein X is O, S, NH or N—(CH$_2$CH$_2$O)$_m$—R$^3$ where m is a number having an average value of zero to about 225, n is a number having an average value of about 40 to about 130, R$^3$ is hydrogen, C$_1$–C$_2$ alkyl, 2-hydroxyethyl or CH$_2$CH$_2$R, and R is a C$_1$–C$_{10}$ hydrocarbyl ether having a molecular weight up to about one-tenth that of the —(CH$_2$CH$_2$O)$_n$— portion, said separation particles having a percent CH$_2$O/mm$^2$ of particle surface area of greater than about 9000 and to about 20,000;

(b) maintaining said contact for a time period sufficient to form chaotropic anion-bound separation particles and an aqueous solution having a reduced concentration, of chaotropic anions;

(c) separating said chaotropic anion-bound separation particles from the aqueous solution of step (b) in the presence of an aqueous solution of a poly(ethylene glycol) liquid/liquid biphase-forming amount of a salt to form a second solid/liquid phase admixture containing chaotropic-bound separation particles;

(d) contacting said chaotropic anion-bound separation particles of step (c) with second aqueous solution that does not contain a poly(ethylene glycol) liquid/liquid biphase-forming amount of dissolved salt to free the chaotropic anions from the separation particles and form an aqueous solution containing free chaotropic anions; and (e) recovering the chaotropic anion-containing aqueous solution.

9. The process according to claim 8 wherein X is O.

10. The process according to claim 9 wherein said poly (ethylene glycol) liquid/liquid biphase-forming dissolved salt has an ammonium or alkali metal cation and an anion selected from the group consisting of hydroxide, fluoride, carbonate, silicate, sulfate, phosphate, formate, succinate, tartrate, citrate, chromate, molybdate, tungstate, orthovanadate, thiocyanate, thiosulfate, fluorosilicate, orthosilicate, hydroxyethane-1,1-diphosphonate, vinylidene-1,1-diphosphonate and the protonated anionic forms thereof.

11. The process according to claim 10 wherein each said chaotropic anion is selected from the group consisting of $TcO_4^{-1}$, $ReO_4^{-1}$, $Br^{-1}$, $I^{-1}$ and $IO_3^{-1}$.

12. The process according to claim 10 wherein each said chaotropic anion is a complex of a metal cation and halide or pseudohalide anions, and each of said aqueous solutions of steps (a), (b) and (c) contains an amount of said halide or pseudohalide anions sufficient to form said complex.

13. The process according to claim 12 wherein each said chaotropic anion is a complex of a soft metal cation and said halide or pseudohalide anion.

14. The process according to claim 12 wherein said metal cation at said complex is selected from the group consisting of $Ag^{+1}$, $Tl^{+1}$, $Cs^{+1}$, $Cu^{+2}$, $Co^{+2}$, $Zn^{+2}$, $Pd^{+2}$, $Cd^{+2}$, $Pt^{+2}$, $Hg^{+2}$, $Pb^{+2}$, $Sn^{+2}$, $CH_3Hg^{+}$, $Tl^{+3}$, $In^{+3}$, $Au^{+3}$, $Bi^{+3}$, $Sb^{+3}$, $Te^{+4}$, and $Pt^{+4}$.

15. The process according to claim 12 wherein said halide or pseudohalide is iodide.

16. A chromatography apparatus comprising a chromatography column containing an aqueous solution and a plurality of separation particles bound to chaotropic anions, said aqueous solution containing a poly(ethylene glycol) liquid/liquid biphase-forming amount of a dissolved salt, said separation particles comprising particles having a plurality of covalently bonded surface $-X-(CH_2CH_2O)_n-CH_2CH_2R$ groups wherein X is S, O, NH or $N-(CH_2CH_2O)_m-R$ wherein m is a number having an average value of zero to about 225, n is a number having an average value of about 15 to about 225, $R^3$ is hydrogen, $C_1-C_2$ alkyl, 2-hydroxyethyl, or $CH_2CH_2R$, and R is selected from the group consisting of $-OH$, $C_1-C_{10}$ hydrocarbyl ether having a molecular weight up to about one-tenth that of said $-(CH_2CH_2O)_n-$ portion, carboxylate, sulfonate, phosphonate and $-NR^1R^2$ groups where each of $R^1$ and $R^2$ is independently hydrogen, $C_1-C_6$ alkyl or $C_2-C_3$ hydroxyalkyl, or $-NR^1R^2$ together form a 5- or 6-membered cyclic amine having zero or one oxygen atom or zero or one additional nitrogen atom in the ring, said separation particles having a percent $CH_2O/mm^2$ of particle surface area of greater than about 8000 and less than about 1,000,000.

17. The chromatography apparatus according to claim 16 wherein each said chaotropic anion is selected from the group consisting of $TcO_4^{-1}$, $ReO_4^{-1}$, $Br^{-1}$, $I^{-1}$ and $IO_3^{-1}$.

18. The chromatography apparatus according to claim 16 wherein each said chaotropic anion is a complex of a metal cation/and halide or pseudohalide anions, and said aqueous aqueous solution contains an amount of said halide or pseudohalide anions sufficient to form said complex.

19. The chromatography apparatus according to claim 16 wherein n has an average value of about 40 to about 130.

20. The chromatography apparatus according to claim 16 wherein R is a $C_1-C_{10}$ hydrocarbyl ether group.

21. The chromatography apparatus according to claim 16 wherein said percent $CH_2O/mm^2$ of particle surface area is about 9,000 to about 20,000.

22. The chromatography apparatus according to claim 16 wherein said separating particles are reacted cross-linked poly(styrene-vinyl benzyl halide) particles.

23. A solid/liquid phase admixture comprising chaotropic anion-bound separation particles as the solid phase in an aqueous solution of a poly(ethylene glycol) liquid/liquid biphase-forming amount of a dissolved salt, said separation particles comprising particles having a plurality of covalently bonded surface $-X-(CH_2CH_2O)_n-CH_2CH_2R$ groups wherein X is S, O, NH or $N-(CH_2CH_2O)_m-R$ wherein m is a number having an average value of zero to about 225, n is a number having an average value of about 15 to about 225, $R^3$ is hydrogen, $C_1-C_2$ alkyl, 2-hydroxyethyl, or $CH_2CH_2R$, and R is selected from the group consisting of $-OH$, $C_1-C_{10}$ hydrocarbyl ether having a molecular weight up to about one-tenth that of said $-(CH_2CH_2O)_n-$ portion, carboxylate, sulfonate, phosphonate and $-NR^1R^2$ groups where each of $R^1$ and $R^2$ is independently hydrogen, $C_1-C_6$ alkyl or $C_2-C_3$ hydroxyalkyl, or $-NR^1R^2$ together form a 5- or 6-membered cyclic amine having zero or one oxygen atom or zero or one additional nitrogen atom in the ring, said separation particles having a percent $CH_2O/mm^2$ of particle surface area of greater than about 8000 and less than about 1,000,000.

24. The solid/liquid phase admixture according to claim 23 wherein each said chaotropic anion is selected from the group consisting of $TcO_4^{-1}$, $ReO_4^{-1}$, $Br^{-1}$, $I^{-1}$ and $IO_3^{-1}$.

25. The solid/liquid phase admixture according to claim 23 wherein each said chaotropic anion is a complex of a metal cation and halide or pseudohalide anions and said aqueous aqueous solution contains an amount of said halide or pseudohalide anions sufficient to form said complex.

26. The solid/liquid phase admixture according to claim 23 wherein n has an average value of about 40 to about 130.

27. The solid/liquid phase admixture according to claim 23 wherein R is a $C_1-C_{10}$ hydrocarbyl ether group.

28. The solid/liquid phase admixture according to claim 23 wherein said percent $CH_2O/mm^2$ of particle surface area is about 9,000 to about 20,000.

* * * * *